United States Patent
Hong et al.

(10) Patent No.: US 11,283,103 B2
(45) Date of Patent: Mar. 22, 2022

(54) SYSTEM AND METHOD FOR RAPID CHARGING LITHIUM ION BATTERY

(71) Applicants: HYUNDAI MOTOR COMPANY, Seoul (KR); KIA MOTORS CORPORATION, Seoul (KR); AUBURN UNIVERSITY, Auburn, AL (US)

(72) Inventors: Sungmin Hong, Seongnam-si (KR); Minseok Song, Auburn, AL (US); Song-Yul Choe, Auburn, AL (US)

(73) Assignees: HYUNDAI MOTOR COMPANY, Seoul (KR); KIA MOTORS CORPORATION, Seoul (KR); AUBURN UNIVERSITY, Auburn, AL (US)

( * ) Notice: Subject to any disclaimer, the term of this patent is extended or adjusted under 35 U.S.C. 154(b) by 244 days.

(21) Appl. No.: 16/661,607

(22) Filed: Oct. 23, 2019

(65) Prior Publication Data

US 2020/0136173 A1    Apr. 30, 2020

Related U.S. Application Data

(60) Provisional application No. 62/751,177, filed on Oct. 26, 2018.

(51) Int. Cl.
*H02J 7/04* (2006.01)
*H02J 7/06* (2006.01)
(Continued)

(52) U.S. Cl.
CPC ....... *H01M 10/0525* (2013.01); *H02J 7/0021* (2013.01); *H02J 7/0077* (2013.01)

(58) Field of Classification Search
USPC ......................... 320/160, 161, 162, 163, 164
See application file for complete search history.

(56) References Cited

U.S. PATENT DOCUMENTS

| | | | |
|---|---|---|---|
| 9,197,089 B2 | 11/2015 | Choe et al. | |
| 10,298,026 B2 * | 5/2019 | Trimboli | H02J 7/005 |
| 2016/0233549 A1 * | 8/2016 | Tiruvannamalai | H01M 10/052 |

FOREIGN PATENT DOCUMENTS

| | | | | |
|---|---|---|---|---|
| JP | 2019058051 A | * | 4/2019 | |
| WO | WO-2017013379 A1 | * | 1/2017 | H01M 4/388 |

OTHER PUBLICATIONS

Minseok Song, et al., "Fast and safe charging method with negative pulses suppressing side reaction and lithium plating in NMC/Graphite lithium ion".40 pgs.
(Continued)

*Primary Examiner* — Brian Ngo
(74) *Attorney, Agent, or Firm* — McDonnell Boehnen Hulbert & Berghoff LLP

(57) ABSTRACT

A system and method for rapid lithium ion battery charging are provided. The method for rapid charging a lithium ion battery may include generating a reduced order electrochemical model (ROM) of the lithium ion battery in which a state-of-charge (SOC) model, a side reaction model and a degradation model are embedded. The method may further include calculating an SOC, a side reaction rate, and a lithium plating rate from the ROM. The method may further include generating a charging protocol based on the SOC and a required SOC, and applying the charging protocol to the lithium ion battery.

18 Claims, 25 Drawing Sheets

(51) Int. Cl.
*H01M 10/0525* (2010.01)
*H02J 7/00* (2006.01)

(56) References Cited

OTHER PUBLICATIONS

Song-Yul Choe et al., "Final report for development of an ultrafast charging algorithm for a high power battery module", Auburn University, Oct. 2018, 125 pgs.

* cited by examiner

US 11,283,103 B2

SYSTEM AND METHOD FOR RAPID CHARGING LITHIUM ION BATTERY

CROSS-REFERENCE TO RELATED APPLICATION

The present application claims priority to and the benefit of the U.S. Provisional Application No. 62/751,177 filed on Oct. 26, 2018, which is hereby incorporated herein by reference in its entirety.

TECHNICAL FIELD

The present disclosure relates to a system and a method for rapid charging a lithium ion battery, and more particularly, to a system and a method for rapid charging a lithium ion battery configured to reduce a charging time and a side reaction rate.

BACKGROUND

The statements in this section merely provide background information related to the present disclosure and may not constitute prior art.

Batteries are widely used as energy storage device for a variety of different applications because of their relatively high energy and power density and relatively low cost in comparison to other storage technologies. Some of such batteries are designed to be recharged. Recently, a lithium ion battery is one of the most preferred one among the available rechargeable battery technologies, for its high energy and power density. For example, most of recent electric vehicle (EV) models utilize a lithium ion battery as power source.

However, since a usual drive range of EVs is still relatively short, more batteries are to be installed to extend the drive range, which results in a long charging time. Therefore, reducing the charging time of the batteries is one of the most important tasks of EV industries.

The charging time can be reduced simply by increasing charging current, which may adversely accelerate degradation of the battery. This problem presents one of major barriers to overcome for rapid commercialization of the EVs.

In the related art, methods of charging a battery considering an allowable maximal ion concentration and a side reaction rate are proposed for reducing the charging time and the side reaction rate simultaneously. However those methods could not solve the problem of lithium plating, which are the main reasons of battery degradation.

SUMMARY

The present disclosure provides a system and a method for rapid charging a lithium ion battery which is a fast and safe charging protocol that limits a side reaction rate and a lithium plating rate by anode potential and terminal cutoff voltage.

In addition, the present disclosure provides a system and a method for rapid charging a lithium ion battery which uses bipolar pulse currents to recover lithium ions out of metallic lithium, particularly at low SOC range.

A method for rapid charging a lithium ion battery in some forms of the present disclosure may include: generating a reduced order electrochemical model (ROM) of the battery in which a state-of-charge (SOC) model, a side reaction model and a degradation model are embedded; calculating an SOC, a side reaction rate, and a lithium plating rate from the ROM; generating a charging protocol based on the SOC and a required SOC; and applying the charging protocol to the battery.

The generation of the charging protocol may include calculating a charging rate (C rate) based on the calculated SOC and the required SOC from a predetermined SOC and C rate relationship.

The applying the charging protocol to the battery may include performing a constant current (CC) charging with the calculated C rate.

The method may further include: during performing the CC charging with the calculated C rate, determining whether at least one of the side reaction rate, the lithium plating rate and a terminal voltage reaches a predetermined threshold; recalculating the C rate based on the calculated SOC and the required SOC from the predetermined SOC and C rate relationship, if the at least one of the side reaction rate, the lithium plating rate and a terminal voltage reaches the predetermined threshold; and performing the CC charging with the recalculated C rate.

The method may further include correcting the ROM with an extended Kalman filter (EKF).

The method may further include: calculating a lithium stripping rate from the ROM; and updating the predetermined SOC and C rate relationship based on the side reaction rate, the lithium plating rate, and the lithium stripping rate.

Negative pulses with a constant negative current may be applied if the calculated SOC is lower than or equal to a predetermined SOC while performing the CC charging with the calculated C rate.

The method may further include: applying a constant positive current corresponding to the calculated C rate to the battery for a first period; and applying a constant negative current to the battery for a second period, when the negative pulses with the constant negative current is applied.

A method for rapid charging a lithium ion battery in some forms of the present disclosure may include: (a) generating a reduced order electrochemical model (ROM) of the battery in which a state-of-charge (SOC) model, a side reaction model and a degradation model are embedded; (b) calculating an SOC, a side reaction rate, a lithium plating rate, and a lithium stripping rate from the ROM; (c) performing a constant current (CC) charging with a maximum charging (C) rate; (d) determining whether at least one of the side reaction rate, the lithium plating rate and a terminal voltage reaches a predetermined threshold; (e) recalculating a C rate based on the calculated SOC and a required SOC from a predetermined SOC and C rate relationship; and (f) performing the CC charging with the recalculated C rate.

The step (b) to the step (f) may be repeated until reaching the required SOC.

The ROM may be corrected using an extended Kalman filter (EKF) at the step (a).

The predetermined SOC and C rate relationship may be updated based on the side reaction rate, the lithium plating rate, and the lithium stripping rate.

Negative pulses with a constant negative current may be applied if the calculated SOC is lower than or equal to a predetermined SOC at the steps (c) and (f).

The method may further include: applying a constant positive current corresponding to the calculated C rate to the battery for a first period; and applying a constant negative current to the battery for a second period, when the negative pulses with the constant negative current is applied.

A system for rapid charging a lithium ion battery, comprising: a charger configured to apply current to the battery; and a controller. The controller may be configured to: generate a reduced order electrochemical model (ROM) of the battery in which a state-of-charge (SOC) model, a side reaction model and a degradation model are embedded; calculate an SOC, a side reaction rate, and a lithium plating rate from the ROM; generate a charging protocol based on the SOC and a required SOC; and apply the charging protocol to the battery through the charger.

The controller may be further configured to: calculate a charging rate (C rate) based on the calculated SOC and the required SOC from a predetermined SOC and C rate relationship, and perform a constant current (CC) charging with the calculated C rate.

The controller may be further configured to: determine whether at least one of the side reaction rate, the lithium plating rate and a terminal voltage reaches a predetermined threshold during the CC charging with the calculated C rate is performed; recalculate the C rate based on the calculated SOC and the required SOC from the predetermined SOC and C rate relationship, if the at least one of the side reaction rate, the lithium plating rate and a terminal voltage reaches the predetermined threshold; and perform the CC charging with the recalculated C rate.

The controller may be configured to correct the ROM with an extended Kalman filter (EKF).

The controller may be further configured to: calculate a lithium stripping rate from the ROM; and update the predetermined SOC and C rate relationship based on the side reaction rate, the lithium plating rate, and the lithium stripping rate.

The controller may be further configured to apply negative pulses with a constant negative current if the calculated SOC is lower than or equal to a predetermined SOC while performing the CC charging with the calculated C rate.

The controller, when the negative pulses with the constant negative current is applied, may be further configured to: apply a constant positive current corresponding to the calculated C rate to the battery for a first period; and apply a constant negative current to the battery for a second period.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
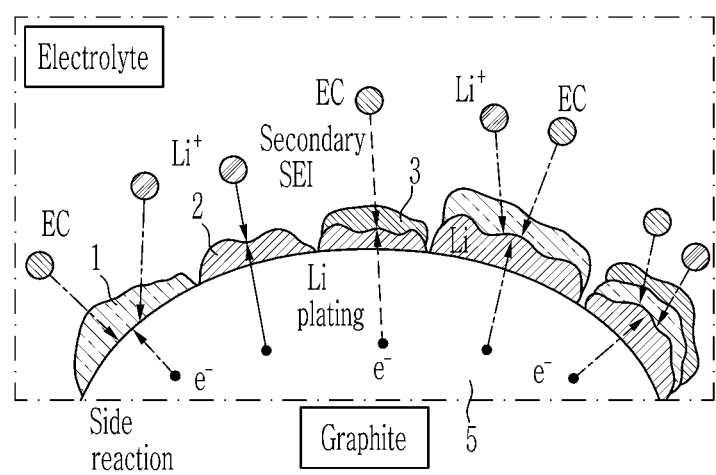
FIG. 1 is a schematic diagram of different types of depositions on a graphite particle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

It is understood that the term "vehicle," "vehicular," "car," or other similar term as used herein is inclusive of motor vehicles, in general, such as passenger automobiles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum).

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by a system comprising the controller, as described in detail below.

Furthermore, the controller in some forms of the present disclosure may be embodied as non-transitory computer readable media containing executable program instructions executed by a processor or the like. Examples of the computer readable mediums include, but are not limited to, ROM, RAM, compact disc (CD)-ROMs, magnetic tapes, floppy disks, flash drives, smart cards, and optical data storage devices. The computer readable recording medium can also be distributed throughout a computer network so that the program instructions are stored and executed in a distributed fashion, e.g., by a telematics server or a Controller Area Network (CAN).

1. Degradation Mechanism

1.1 Aging mechanisms

Aging phenomena of a lithium ion battery are very complex, affected by electrochemical reactions, a heat generation and a mechanical stress. The most dominant causes are by electrochemical reactions that include a side reaction and a lithium deposition reaction that is also called lithium plating. The side reaction taking place in a cell considers two reactions as follows.

$$2Li^+ + 2e^- + EC \rightarrow CH_2=CH_2 + Li_2CO_3\downarrow \quad (1)$$

$$2Li^+ + 2e^i + 2EC \rightarrow CH_2=CH_2=CH_2 + (CH_2OCO_2Li)_2\downarrow \quad (2)$$

Here, EC means ethylene carbonate.

Main products are $Li_2CO_3$ and $(CH_2OCO_2Li)_2$ that form compounds of a thin passive layer on an anode particle surface that is called solid electrolyte interphase (SEI). An initial SEI is artificially created to protect an electrode from further reaction with an electrolyte because of its permeability to lithium ions but impermeability to electrons. However, as cycled, the side reaction takes place continuously, which results in a continuous growth of the SEI layer.

As a result, internal impedance gets increased and power gets faded. The lithium ions consumed by the side reaction and trapped in isolated particles due to being completely covered by the SEI layers leads to capacity fade.

On the other hand, the lithium deposition reaction forms a metallic solid lithium from the lithium ions and the electrons, which can be expressed as follows.

$$Li^+ + e^- \rightarrow Li(s) \quad (3)$$

Lithium plating consumes the lithium ions, while a metallic plate covers a surface of the particles on an anode electrode and reduces an active area. In addition, some plated lithium metal reacts with the electrolyte and becomes insoluble products such as the $Li_2CO_3$ and the $(CH_2OCO_2Li)_2$, which is called secondary SEI. The products can block pores and reduce ionic kinetics, which also leads to power and capacity fade. Moreover, a certain amount of the lithium plating can be dissolved during discharge, which is called a lithium dissolution reaction or a lithium stripping. This reaction allows for recovering the lithium ions that are lost during the lithium plating. Due to lithium plating, a thickness of the SEI grows, conductivity of the electrolytes decreases and a layer is formed by a new SEI and the secondary SEI at an interface between the anode and a separator that is called a deposit layer. All of the changes are summarized with two impedances, the SEI and the deposit layer. The decrease of the active area and the increases of the two resistances are the main causes for degradation.

At the beginning of cycling, degradation is dominantly caused by the side reaction, which results in a linearly fading capacity as cycling. As the cycling continues, due to the continuously growing SEI, a porosity of the anode electrode becomes less, which reduces anode ionic kinetics. As a result, a gradient of an electrolyte potential increases and an anode potential becomes decreased, which leads to an increased rate of the lithium plating. Decrease of the anode porosity and increase of the lithium plating amplifies each other, so aging process becomes accelerated and the capacity fades rapidly. This mechanisms leads to transition of the capacity fade from linear to nonlinear range.

1.2 Main Reaction

A reaction rate produced by a main chemical reaction taking place at the interface between the electrode and the electrolyte is governed by Butler-Volmer (BV) equation.

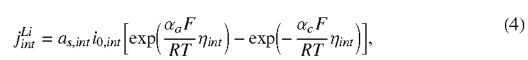

$$j_{int}^{Li} = a_{s,int} i_{0,int} \left[ \exp\left(\frac{\alpha_a F}{RT}\eta_{int}\right) - \exp\left(-\frac{\alpha_c F}{RT}\eta_{int}\right) \right], \quad (4)$$

where $a_{s,int}$ is a specific reaction area of an intercalation, $i_{0,int}$ is an exchange current density of the intercalation, R is universal gas constant, T is a cell temperature, $\eta_{int}$ is a local value of a surface overpotential, $\alpha_a$ is an anodic intercalation factor, F is Faraday constant, and $\alpha_c$ is a cathodic intercalation factor. $\alpha_a$ and $\alpha_c$ are the constants that are symmetric in the main reaction and set as 0.5 for each value.

The exchange current density of the intercalation $i_{o,int}$ can be expressed as follows;

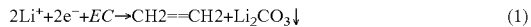

$$i_0 = k(c_e)^{\alpha_a}(c_{s,max} - c_{s,surf})^{\alpha_a}(c_{s,surf})^{\alpha_a}, \quad (5)$$

where k is kinetic rate constant, $c_e$ is an ion concentration, and $c_{s,max}$ and $c_{s,surf}$ are a maximum concentration and a surface concentration of the particles, respectively.

If the SEI layer does not exist, the overpotential for the main intercalation is given as follows;

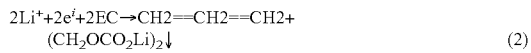

$$\eta_{int} = \varphi_s - \varphi_s - U_{eq,int}, \quad (6)$$

where $\varphi_s$ is electric potential of a solid, $\varphi_e$ is electric potential of the electrolyte, and $U_{eq,int}$ is the equilibrium potential for the intercalation.

When the degradation takes place, the products results from the side reaction and the lithium plating are deposited on the anode particles. A schematic diagram of a graphite particle on the anode electrode is shown in FIG. 1, which includes different products. A first layer 1 and a second layer 2 represent the SEI layer formed by the side reaction and the plated lithium metal formed by the lithium deposition reaction, respectively. When the lithium metal reacts with solvents of the electrolyte on the plated lithium, a secondary SEI layer 3 is produced. Since the SEI layer 1 is ionic conductive but isolative to the electrons, all reactions that include the main reaction, the side reaction and the lithium deposition reaction take place at an interface between the SEI layer 1 and the particle 5. On the other hand, once the lithium metal 2 is deposited on the particle surface, no ions can be transported through the plated lithium because of its permeability to the electrons but impermeability to the ions. As a result, no further main reaction is possible. However, the electrons in the particles 5 can flow through the plated lithium and participate in the side reaction on the surface of the plated lithium. Even if the SEI layer 1 or the secondary SEI layer 3 on the plated lithium already exist, it is still possible for the additional secondary SEI layer 3 or the SEI layer 1 to build at an interface of the plated lithium and the SEI layer.

Here, it is assumed that the products of the secondary SEI layer are the same as those of the SEI layer. In addition, decrease of the active area and the porosity is calculated from an average thickness of the deposits and effects of dendrites are not considered.

Figure 2:
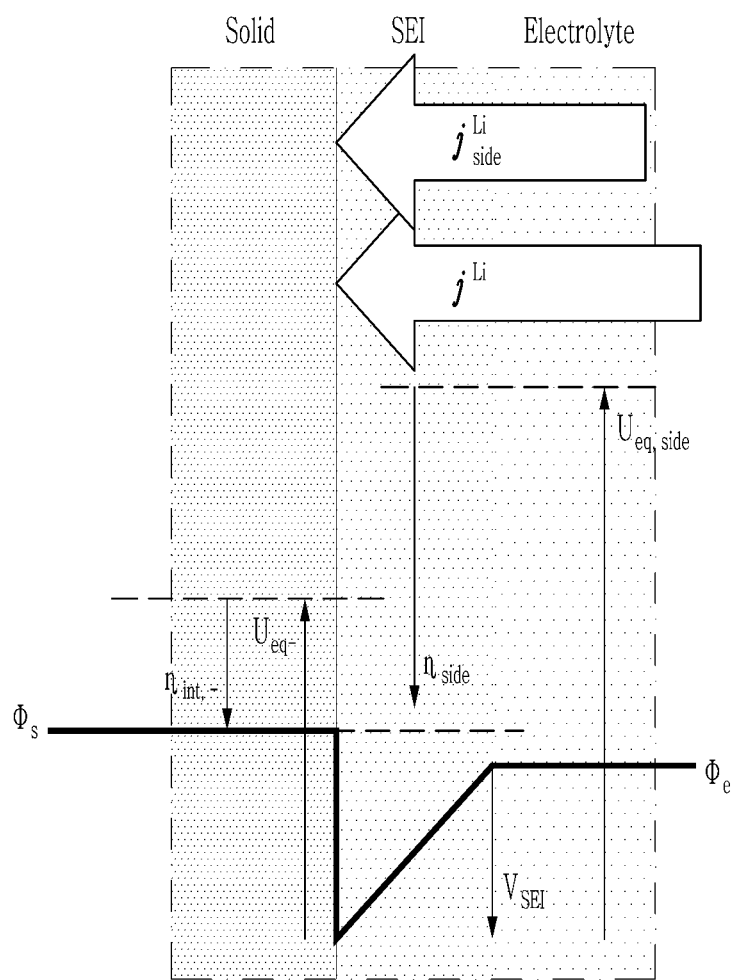
FIG. 2 is a schematic diagram of a potential at an anode electrode during charging with a SEI layer.

Based on the assumptions above, a schematic diagram of the potential the anode electrode during charging considering the side reaction with the SEI layer is shown in FIG. 2. The overpotential for the main intercalation from equation (6) is decreased by a voltage drop ($V_{SEI,int}$) from a resistance of the SEI layer;

$$\eta_{int} = \varphi_s - \varphi_e - U_{eq,int} - V_{SEI,int} \quad (7)$$

$$V_{SEI,int} = \frac{R_{SEI,total}}{a_{s,int}} j^{Li}_{total}, \quad (8)$$

where $j^{Li}_{total}$ is a total reaction rate that includes the main reaction ($j^{Li}_{int}$), the side reaction ($j^{Li}_{side}$) and the lithium deposition reaction ($j^{Li}_{Li}$) or the lithium dissolution reaction;

$$j^{Li}_{total} = j^{Li}_{int} + j^{Li}_{side} + j^{Li}_{Li} \quad (9)$$

$R_{SEI,total}$ is a sum of a SEI resistance ($R_{SEI}(\tau)$) and a secondary SEI resistance ($R_{SEI,sec}(\tau)$). $\tau$ is a time and $R_{SEI,0}$ is the SEI resistance formed at initial cycle.

1.3 Side Reaction

The rate of side reaction can be also expressed using the BV equation.

$$j^{Li}_{side} = a_s i_{0,side} \left[ \exp\left( \frac{\alpha_{a,side} n_{side} F}{RT} \eta_{side} \right) - \exp\left( -\frac{\alpha_{c,side} n_{side} F}{RT} \eta_{side} \right) \right], \quad (11)$$

where $a_s$ is a specific reaction area of the side reaction, $i_{0,side}$ is an exchange current density of the side reaction that is a function of reactants of the side reaction, the lithium ions, and the EC molecules, $\alpha_{a,side}$ is an anodic intercalation factor of the side reaction, $n_{side}$ is the number of the ions involved in the side reactions that is equal to 2, $\alpha_{c,side}$ is a cathodic intercalation factor of the side reaction, and $\eta_{side}$ is a local value of a surface overpotential. The exchange current density of the side reaction ($i_{0,side}$) can be expressed as follows;

$$i_{0,side} = k_{side} \sqrt{c_{s,surf} C_{EC,R_s}}, \quad (12)$$

where $k_{side}$ is a kinetic rate constant for the side reaction, and $c_{s,surf}$ and $c_{EC,R_s}$ are concentrations of the lithium ions and the EC molecules at the surface of the anode particles. In addition, the local value of a surface overpotential ($\eta_{side}$) is defined as follows;

$$\eta_{side} = \varphi_s - \varphi_e - U_{eq,side} - \frac{R_{SEI,total}}{a_{s,side}} j^{Li}_{total}, \quad (13)$$

where $a_{s,side}$ is a specific reaction area of the side reaction and $U_{eq,side}$ is the equilibrium potential for the side reaction.

Since the side reaction is irreversible and dominated by a reduction process rather than an oxidation process, the equation (11) can be simplified as follows.

$$j^{Li}_{side} = -a_s i_{0,side} \exp\left( -\frac{\alpha_{c,side} n_{side} F}{RT} \eta_{side} \right) \quad (14)$$

The total number of the consumed lithium ions is given by integration of the reaction rate over a composite anode and a cycling time.

$$C_{ionloss,side}(\tau) = \int^{\delta_-}_{x=0} \left\{ \int^{\tau}_{t=0} j^{Li}_{side}(x,t) dt \right\} A dx, \quad (15)$$

where $C_{ionloss,side}$ is the consumed lithium ions, $\delta_-$ is a thickness of the composite anode, and A is a cross sectional area of the cell. On the other hand, an amount of consumed solvents of the electrolyte is reflected with a volume fraction rate of the electrolyte as follows;

$$\Delta\varepsilon_{e,side}(\tau) = -\frac{\alpha \tilde{V}_e C_{ionloss,side}(\tau)}{A\delta_- F}, \quad (16)$$

where $\tilde{V}$ is a molar volume of the electrolyte and $\alpha$ is a reaction coefficient of the EC. Under the assumption that the products from the side reaction have the same reaction rate, the average value of the consumed solvents of the electrolyte is 0.5 for $Li_2CO_3$ and 1 for $(CH_2OCO_2Li)_2$ when one mole of the lithium ion is consumed.

Subsequently, an effective diffusivity ($D^{eff}_e$) of the lithium ion in the electrolyte is affected by a change of the electrolyte volume fraction, as follows;

$$D^{eff}_e = D_e \cdot \varepsilon_e, \quad (17)$$

where $D_e$ is a diffusion coefficient in the electrolyte and $\varepsilon_e$ is a porosity that indicates a volume fraction of electrolyte that decreases as degraded.

Similarly, the change ($\Delta\varepsilon_{e,side}(x,\tau)$) of the volume fraction of the active material caused by the deposition of the SEI layer can be described as follows.

$$\Delta\varepsilon_{e,side}(x,\tau) = -\frac{\tilde{V}_{SEI}}{n_{side}F}\int_{t=0}^{\tau} j_{side}^{Li}(x,t)dt \quad (18)$$

The changes ($\Delta\delta_{SEI}(x,\tau)$, $\Delta\delta_{DL,side}(\tau)$) of an average thickness of the SEI layer at different locations and a deposit layer can be expressed as;

$$\Delta\delta_{SEI}(x,\tau) = -\frac{\tilde{V}_{SEI}}{a_s n_{side}F}\int_{t=0}^{\tau} j_{side}^{Li}(x,t)dt \quad (19)$$

$$\Delta\delta_{DL,side}(\tau) = -\frac{\tilde{V}_{SEI}R_s}{n_{side}F}\int_{t=0}^{\tau} j_{side}^{Li}(\delta_-,t)dt, \quad (20)$$

where $\tilde{V}_{SEI}$ is a molar volume of the SEI layer and $R_s$ is a radius of the anode particle.

Corresponding increase of the resistances for the SEI and the deposit layer can be obtained using an ionic conductivity of the SEI and the deposit layer as follows;

$$\Delta R_{SEI}(x,\tau) = \Delta\delta_{SEI}(x,\tau)/K_{SEI} \quad (21)$$

$$\Delta R_{DL}(\tau) = \Delta\delta_{DL,side}(\tau)/K_{DL} \quad (22)$$

1.4 Lithium deposition reaction and dissolution reaction

The lithium deposition reaction and the lithium dissolution reaction are reduction and oxidation reaction processes, which are called with other words, lithium plating and lithium stripping, respectively. A rate of the lithium plating or the stripping can be also expressed using BV equation $$j_{LiP/S}^{Li} = a_{s,Li}i_{0,Li}\left[\exp\left(\frac{\alpha_{a,Li}F}{RT}\eta_{LiP/S}\right) - \exp\left(-\frac{\alpha_{c,Li}F}{RT}\eta_{LiP/S}\right)\right], \quad (23)$$

$i_{0,Li}$ is an exchange current density of the reaction.

In fact, because the secondary SEI is insoluble, the lithium plating and stripping are semi-reversible. Therefore, $\alpha_{c,Li}$ and $\alpha_{a,Li}$ are set to be 0.3 and 0.7.

The lithium deposition reaction occurs during charging when the local lithium deposition overpotential against a reference of Li/Li+ is less than 0V, which makes kinetics of the lithium deposition reaction higher than that of the main reaction.

Conversely, the lithium stripping takes place during discharging. When short discharging currents are applied during charging (pulse charging), not only a concentration of the lithium ions are decreased but also the plated lithium metal is dissolved and the lithium ions are released. If the plated lithium has already reacted with the EC and becomes the secondary SEI, the plated lithium cannot be dissolved. If the plated lithium is completely covered by the primary or the secondary SEI layer, the lithium is no longer dissolved and becomes a dead lithium.

A model for the lithium stripping is developed under following assumptions:

The lithium stripping takes place only when the plated lithium is already generated;

The reaction rate of the lithium stripping cannot be larger than that of the lithium plating, which means if the plated lithium is completely dissolved, no more lithium stripping exists;

Once the plated lithium reacts with the EC and generates the secondary SEI, the lithium stripping cannot take place; and The rate of the secondary SEI formation from the lithium plating is constant.

1.4.1 Lithium Plating

The overpotential of the lithium plating is expressed by $$\eta_{Li} = \varphi_s - \varphi_e - U_{eq,Li} - \frac{R_{SEI,total}}{a_{s,Li}}j_{total}^{Li} \quad (24)$$

$$\eta_{LiP} = \begin{cases} 0 & \text{for } \eta_{Li} \geq 0 \\ \eta_{Li} & \text{for } \eta_{Li} < 0 \end{cases} \text{ for lithium plating.}$$

where $a_{s,Li}$ is a specific active area of the lithium plating that is the same as $a_{s,side}$, $U_{eq,Li}$ is an equilibrium potential for the lithium deposition and dissolution reaction and is assumed to be zero because the potential is measured with respect to a lithium metal reference.

The total number ($C_{ionloss,LiP}(\tau), C_{ionloss,SEI,sec}(\tau)$) of the ion loss consumed by the lithium plating and the secondary SEI is obtained by integration of the reaction rate over the composite anode during a given time.

$$C_{ionloss,LiP}(\tau) = \int_{x=0}^{\delta_-} \{\int_{\tau=0}^{\tau}(1-\lambda)j_{LiP}^{Li}(x,t)dt\}Adx \quad (25)$$

$$C_{ionloss,SEI,sec}(\tau) = \int_{x=0}^{\delta_-} \{\int_{\tau=0}^{\tau}\lambda \cdot j_{LiP}^{Li}(x,t)dt\}Adx, \quad (26)$$

where $\lambda$ is a ratio for the amount between the plated lithium and the secondary SEI layer formed from the plated lithium.

The consumed electrolyte ($\Delta\varepsilon_{e,SEI,sec}(\tau)$) by the secondary SEI can be expressed as follows;

$$\Delta\varepsilon_{e,SEI,sec}(\tau) = -\frac{\alpha \tilde{V}_e C_{ionloss,SEI,sec}(\tau)}{A\delta\_F}, \quad (27)$$

where $\alpha$ is assumed to be the same as that of the side reaction. It also changes the effective diffusivity of the lithium ion from the equation (17).

A volume fraction of the active material induced by the plated lithium and the secondary SEI layer is expressed as follows:

$$\Delta\varepsilon_{s,LiP}(x,\tau) = -\frac{\tilde{V}_{Li}}{n_{LiP}F}\int_{t=0}^{\tau}(1-\lambda)j_{LiP}^{Li}(x,t)dt \quad (28)$$

$$\Delta\varepsilon_{e,SEI,sec}(x,\tau) = -\frac{\tilde{V}_{SEC}}{n_{side}F}\int_{t=0}^{\tau}\lambda \cdot j_{LiP}^{Li}(x,t)dt, \quad (29)$$

where $\tilde{V}_{Li}$ is a molar volume of the plated lithium.

Increase of a thickness of the secondary SEI layer from the plated lithium can be expressed as;

$$\Delta\delta_{SEI,sec}(x,\tau) = -\frac{\tilde{V}_{SEI}}{a_s n_{side}F}\int_{t=0}^{\tau} j_{LiP}^{Li}(x,t)dt \quad (30)$$

Corresponding increase of the SEI resistance including SEI and secondary layer can be expressed from the equation (21).

Increase of a thickness of the deposit layer from the plated lithium and the secondary SEI layer can be expressed individually as follows;

$$\Delta\delta_{DL,LiP}(\tau) = \frac{\tilde{V}_{LiP}R_s}{F}\int_{t=0}^{\tau}(1-\lambda)j_{LiP}^{Li}(\delta_-,t)dt \quad (31)$$

$$\Delta\delta_{DL,SEI,sec}(\tau) = \frac{\tilde{V}_{SEC}R_s}{n_{side}F}\int_{t=0}^{\tau}\lambda \cdot j_{LiP}^{Li}(\delta_-,t)dt \quad (32)$$

Corresponding increase of the deposit layer resistances including the SEI, the secondary SEI layer and the plated lithium can be expressed from the equation (22).

1.4.2 Lithium Stripping

Likewise, the overpotential for the lithium stripping is defined by $$\eta_{LiS} = \begin{cases} \eta_{Li} & \text{for } \eta_{Li} \geq 0 \\ 0 & \text{for } \eta_{Li} < 0 \end{cases} \text{ for lithium stripping}$$

where $\eta_{Li}$ is calculated according to the equation (24). Because of the lithium stripping, the total amount of the recovered lithium ions can be obtained by integration of the reaction rate over the composite anode and time.

$$C_{ionrecover,LiS}(\tau) = \int_{x=0}^{\delta_-} \{\int_{t=0}^{\tau} j_{LiS}^{Li}(x,t)d\tau\} A dx \quad (33)$$

Finally, the total ion loss by the lithium deposition reaction is the sum of individual loss that is given by the equations (25), (26) and (33);

$$C_{ionloss,Li}(\tau) = C_{ionloss,LiP}(\tau) + C_{ionloss,SEI,sec}(\tau) + C_{ionrecover,LiS}(\tau) \quad (34)$$

2. Reduced Order Electrochemical Model (ROM) Considering Degradation

Analysis and design of a charging protocol considering degradation require information on the ion concentrations, the side reaction rate and the anode potential in real time that cannot be measured from a terminal of a battery cell. These variables can be estimated using a validated electrochemical model. Charging or discharging of lithium ion battery involves several processes that include ion transport and reactions. They are migration, diffusion, and intercalation or deintercalation. The processes are governed by nonlinear or partial differential equations (PDE) that describe physical laws, which is used to construct a full order model (FOM). Solving the equations is very computational intensive. Thus, the FOM is inappropriate for control purposes in real time even high accuracy. A possible approach is to reduce order of the FOM by converting PDEs into ordinary differential equations (ODEs) and linearize the nonlinear equations, which is call a reduced order electrochemical model (ROM). Details of the equations are summarized in Table 1.

TABLE 1

| Cell dynamics | FOM | ROM |
|---|---|---|
| Ion concentration in electrode | $\frac{\partial c_s}{\partial t} = \frac{D_s}{r^2} = \frac{\partial}{\partial r}\left(r^2\frac{\partial c_s}{\partial r}\right)$ | $\frac{d}{dt}c_{s,ave} + 3\frac{j^{Li}}{R_s a_s F} = 0$ |
| | $\frac{1}{r}\frac{\partial c_s}{\partial t}\Big|_{r=0} = 0$ and | $\frac{d}{dt}q_{ave} + 30\frac{D_s}{R_s^2}q_{ave} + \frac{45}{2}\frac{j^{Li}}{R_s^2 a_s F} = 0$ |
| | $D_s\frac{\partial c_s}{\partial t}\Big|_{r=R_s} = -\frac{j^{Li}}{a_s F}$ | $35\frac{D_s}{R_s}(c_{s,surf} - c_{s,ave}) - 8D_s q_{ave} = -\frac{j^{Li}}{a_s F}$ |
| Ion concentration in electrolyte | $\frac{\partial(\varepsilon_e c_e)}{\partial t} = \frac{\partial}{\partial x}\left(D_e^{eff}\frac{\partial}{\partial x}c_e\right) + \frac{1-t_+^0}{F}j^{Li}$ | $\dot{c}_e = A^* \cdot c_e + B^* \cdot I$ <br> $y = C^* \cdot c_e + D^* \cdot I$ |
| Ohm's law in electrode | $\frac{\partial}{\partial x}\left(\sigma^{eff}\frac{\partial}{\partial x}\varphi_s\right) - j^{Li} = 0$ | $\frac{\partial}{\partial x}\left(\frac{\partial}{\partial x}\varphi_s\right) = \frac{j^{Li}}{\sigma^{eff}}$ |
| | $-\sigma^{eff}\frac{\partial}{\partial x}\varphi_s\Big|_{x=0} = -\sigma^{eff}\frac{\partial}{\partial x}\varphi_s\Big|_{x=L} = \frac{1}{A}$ | $-\sigma^{eff}\frac{\partial}{\partial x}\varphi_s\Big|_{x=0} = -\sigma^{eff}\frac{\partial}{\partial x}\varphi_s\Big|_{x=L} = \frac{1}{A}$ |
| | $\frac{\partial}{\partial x}\varphi_s\Big|_{x=\delta_-} = \frac{\partial}{\partial x}\varphi_s\Big|_{x=\delta_-+\delta_{sep}} = 0$ | $\frac{\partial}{\partial x}\varphi_s\Big|_{x=\delta_-} = \frac{\partial}{\partial x}\varphi_s\Big|_{x=\delta_-+\delta_{sep}} = 0$ |
| Ohm's law in electrolyte | $\frac{\partial}{\partial x}\left(K^{eff}\frac{\partial}{\partial x}\varphi_e\right) + \frac{\partial}{\partial x}\left(K_D^{eff}\frac{\partial}{\partial x}\ln c_e\right) + j^{Li} = 0$ | $\frac{\partial}{\partial x}\left(\frac{\partial}{\partial x}\varphi_e\right) + \frac{j^{Li}}{K^{eff}} = 0$ |
| | $\frac{\partial}{\partial x}\varphi_e\Big|_{x=0} = \frac{\partial}{\partial x}\varphi_e\Big|_{x=L} = 0$ | $\frac{\partial}{\partial x}\varphi_e\Big|_{x=0} = \frac{\partial}{\partial x}\varphi_e\Big|_{x=L} = 0$ |
| Electrochemical kinetics | $j^{Li} = a_s i_0\left\{\exp\left[\frac{\alpha_a nF}{RT}\eta\right] - \exp\left[\frac{\alpha_c nF}{RT}\eta\right]\right\}$ | $j^{Li} = a_s i_0 \frac{n(\alpha_a + \alpha_c)F}{RT}\eta$ |
| SOC | | $SOC = \frac{1}{\delta_-}\int_0^{\delta_-}\frac{(c_{s,ave} - c_{s,max}Stoi_{100})}{c_{s,max}(Stoi_{100} - Stoi_0)}dx$ |

A method for reducing the order of the FOM into the ROM is disclosed by Fu et al., "Development of a physics-based degradation model for lithium ion polymer batteries considering side reactions", Journal of Power Sources 278: 506-521, 2015; Li et al., "A reduced order electrochemical and thermal model for a pouch type lithium ion battery with $LiNi_xMn_yCo_{1-x-y}O_2/LiFePO_4$ blended cathode", Journal of Power Sources 294: 545-555, 2015; Xiao et al., "Impedance model of lithium ion polymer battery considering temperature effects based on electrochemical principle: Part I for high frequency", Journal of Power Sources 277: 403-415, 2015; Xiao et al., "Theoretical and experimental analysis of heat generations of a pouch type $LiMn2O_4$/carbon high power Li-polymer battery", Journal of Power Source 241: 46-55, 2013; and Zhao et al., "A highly efficient reduced order electrochemical model for a large format LiMn2O4/Carbon polymer battery for real time applications", Electrochimica Acta 164: 97-107, 2015, the entire content of which is hereby incorporated herein by reference.

2.1 Validation

In order to experimentally validate the constructed ROM embedded with the side reaction and the lithium deposition reaction model, 2C CC/CV charging is applied and the capacity is measured as a function of cycle numbers.

Figure 3:
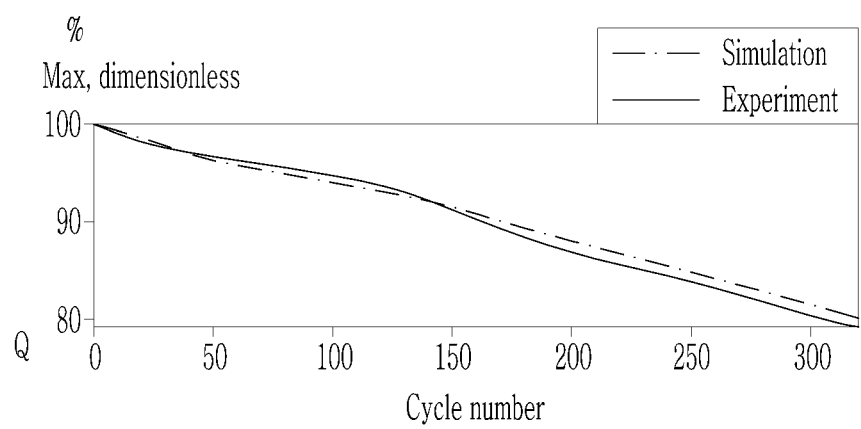
FIG. 3 are graphs showing experimental and simulated capacity fade by 2C constant current (CC)/constant voltage (CV) charging and an error between the experimental and simulated capacity fade.
Figure 3:
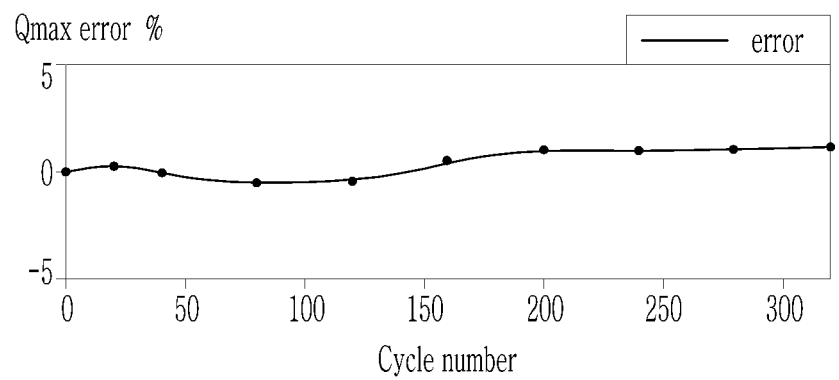
Figure 4:
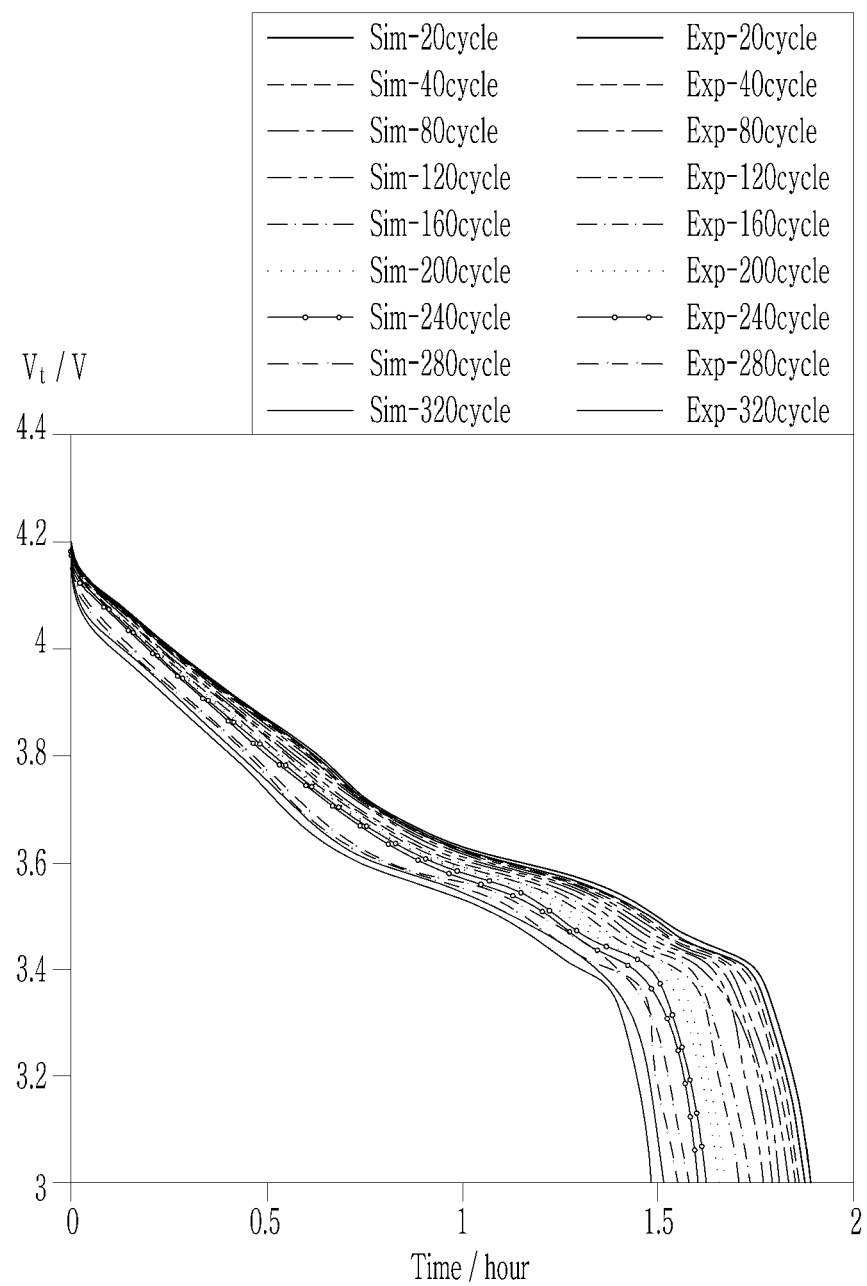
FIG. 4 is a graph showing experimental and simulated terminal voltage at discharge with 0.5C CC.

Results of the capacity, errors and discharge characteristics of the terminal voltages are shown in FIG. 3 and FIG. 4. The prediction error of the capacity by the ROM is less than 1% with accurate tracking ability for the voltage. Hence, the capacity drops almost linear because no lithium plating takes place until 300 cycles.

Figure 5:
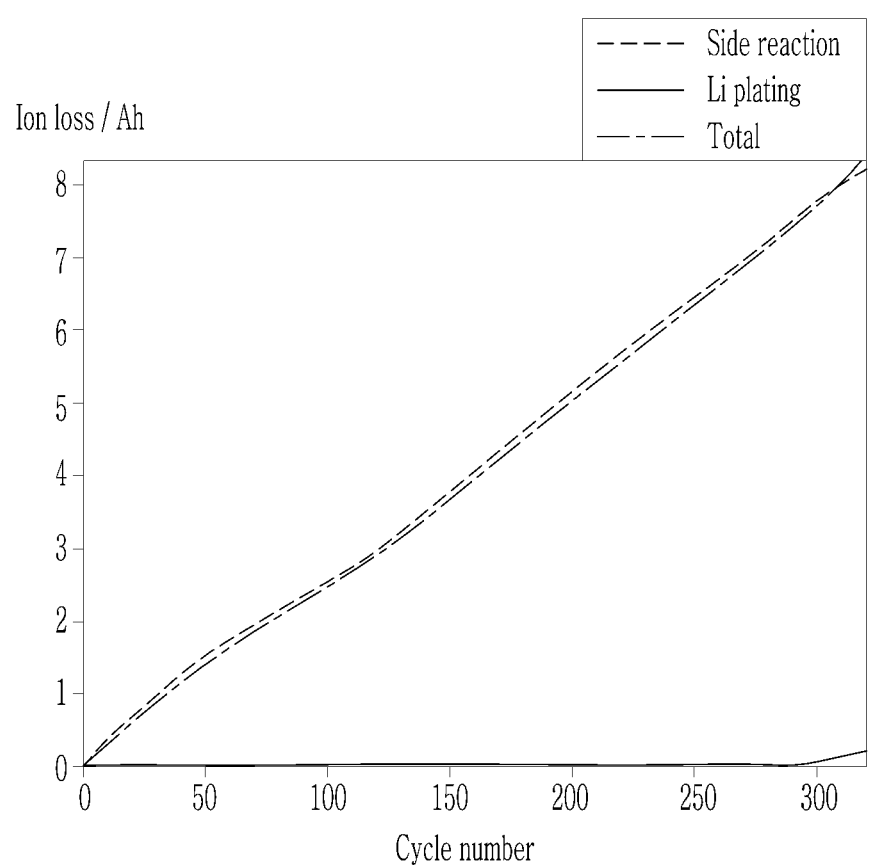
FIG. 5 is a graph showing an ion loss calculated using a degradation model with 2C CC/CV charging.
Figure 6:
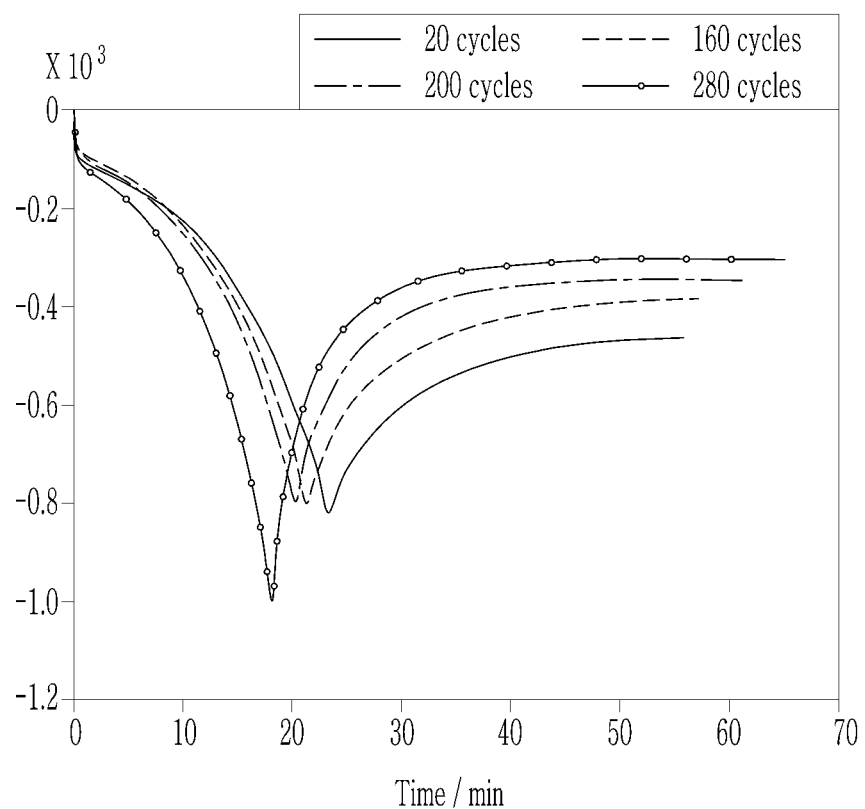
FIG. 6 is a graph showing a side reaction rate as a function of cycle numbers with 2C CC/CV charging.

With the model, the ion loss is calculated as a function of the cycle number using the model for both reactions and plotted in FIG. 5. As shown in FIG. 5, no lithium plating occurs and the ion loss increases linearly. The side reaction rate at the interface between the anode and the separator is calculated as a function of the cycle numbers and plotted in FIG. 6. As shown in FIG. 6, the side reaction rate decreases as the charging current decreases in the CV charging.

Figure 7:
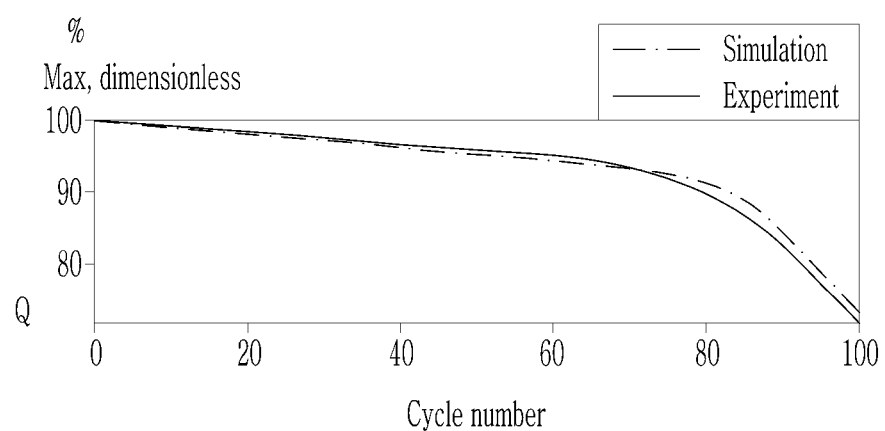
FIG. 7 are graphs showing experimental and simulated capacity fade by 2C CC/CV charging and an error between the experimental and simulated capacity fade.
Figure 7:
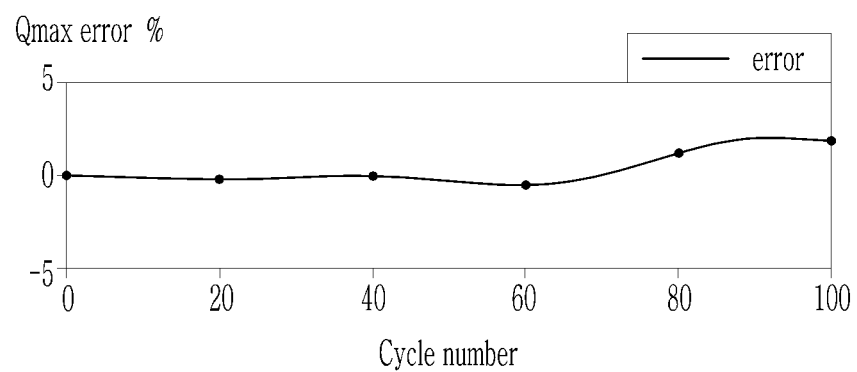

As a matter of fact, high current rates during charging process is one of favorite conditions for formation of the lithium plating and thus the cells are charged with 5C until 40% of state-of-charge (SOC) until 100 cycles. As shown in FIG. 7, experimental data of the capacity is compared with that by simulation. As shown in FIG. 7, the model can predict the capacity fade well and the error is less than 1% for 100 cycles. In addition, there is a transition from a linear to a nonlinear range caused by the lithium plating.

This transition can be better explained with the lithium deposition over potential during charging process that is a primary factor for formation of the lithium plating according to the BV equation.

Figure 8A:
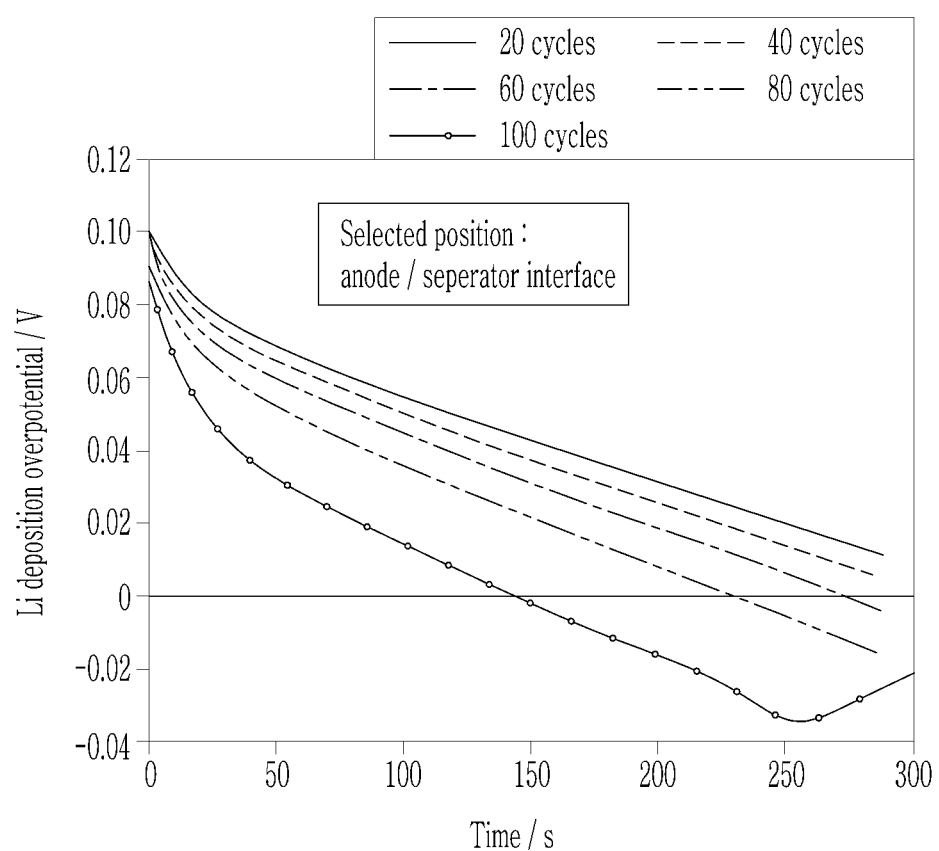
FIG. 8A is a graph showing a lithium deposition overpotential during charging as a function of a charging time.
Figure 8B:
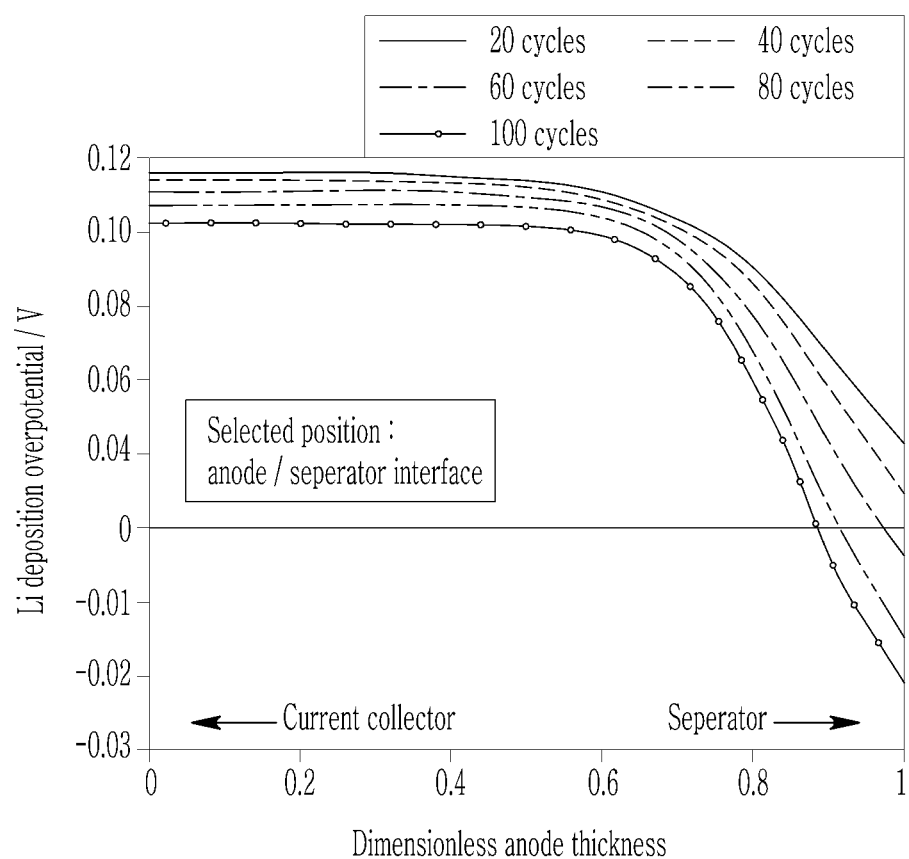
FIG. 8B is a graph showing a lithium deposition overpotential during charging as a function of a location in an anode.

The linear and nonlinear range of the capacity fade is further investigated using the lithium deposition over potential at the particle closely located to the separator, as shown in FIGS. 8A and 8B.

When the cells are getting aged, the over potential decreases and becomes negative at 60 cycles that represents a favorite condition for formation of the lithium plating. As the cycle number increases, more lithium plating takes place, which results in a rapid and nonlinear drop of the capacity. Particularly, the increase of the over potential at 100 cycles shortly after 250 seconds is caused by a change of the charging mode from CC to CV because of the degradation and the associated reduced time to reach a cutoff voltage. In addition, the over potential is dependent upon a location. The closer the location of the particles to the separator is, the lower the over potential becomes. Moreover, when more lithium deposition takes place, the deposited metallic lithium covers the surface and the pores of the particles, so the volume fraction of the active material decreases, especially severe near the separator. As a result, the closer the location of the particles to the separator is, the less is the available active area, which increases the magnitude of the over potential and accelerates the lithium plate like a positive feedback that extends to opposite direction of the separator.

Figure 9A:
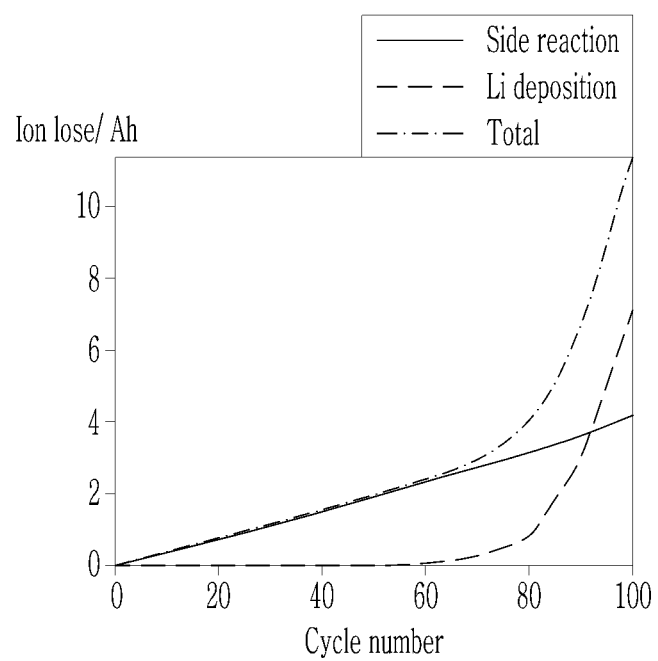
FIG. 9A is a graph showing an ion loss by a side reaction and a lithium plating and a total ion loss at 5C CC charging.
Figure 9B:
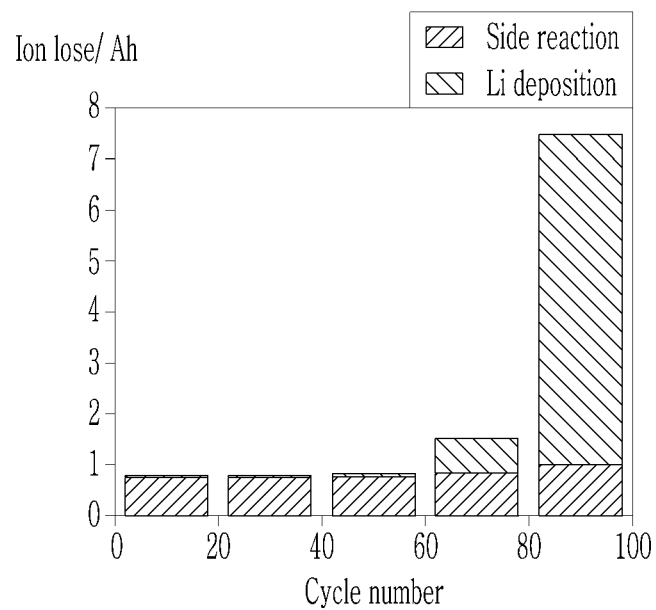
FIG. 9B is a graph showing an ion loss by a side reaction and a lithium plating during 20 cycles.

The ion loss during every 20 cycles caused by the side reaction and the lithium deposition reaction is shown separately and then summed up, as shown in FIGS. 9A and 9B. At the beginning of cycling, the ion loss is mainly caused by the side reaction. After 60 cycles, the deposition reaction starts to take place and then increases rapidly, which results in the nonlinear and rapid increase of the capacity loss and the transition from the linear to the nonlinear increase.

3. Rapid Charging System and Rapid Charging Method

The limitations of a conventional rapid charging method are the side reaction rate and the cutoff voltage to minimize the ion loss caused by the side reaction. One of other major causes for degradation is the lithium plating that is directly related to negative lithium deposition over potential, given by equation (24), presents a favorite condition for formation of the lithium plating, which leads to the loss of the ions. In some forms of the present disclosure, the anode potential, which is $\phi_s - \phi_e$, is used for simplification purpose and actually, considering the anode potential is more conservative limitation than the lithium plating over potential so that it can reduce degradation comprehensively.

Figure 10:
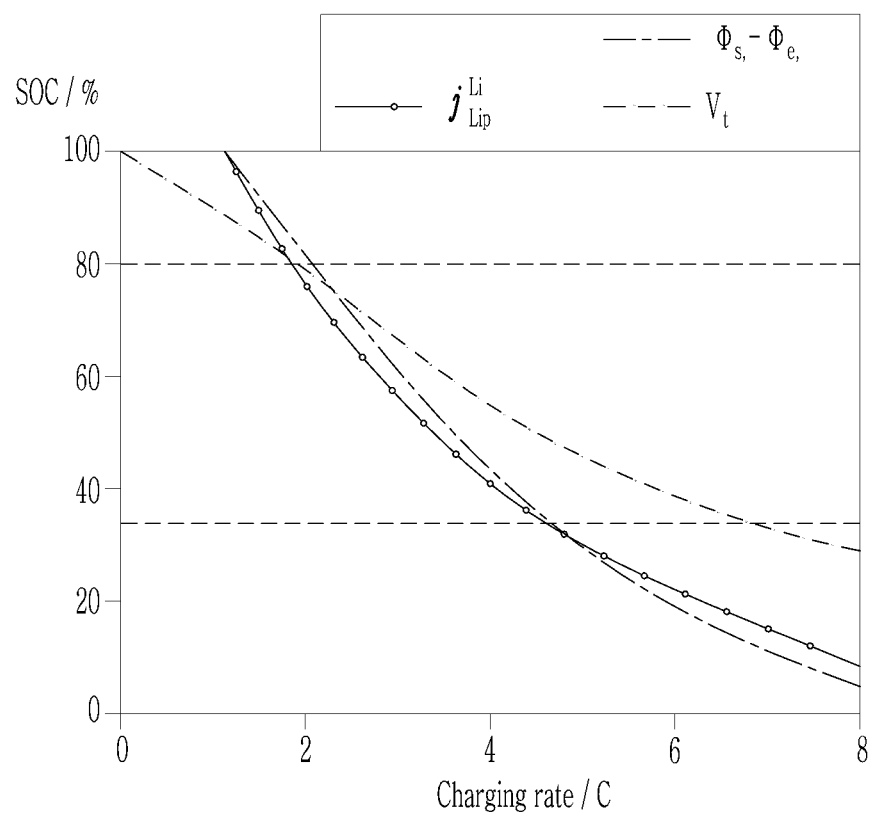
FIG. 10 is a graph showing different limitations for charging C rates as a function of a state-of-charge (SOC)

The three limitations for C rates as a function of SOC are calculated using ROM and plotted in FIG. 10, which should minimize degradation of the cell. When charged from 0% SOC, the first limitation during the low SOC is by the anode potential that should not exceed zero voltage and the following limitations are the side reaction rate and the terminal cutoff voltage.

Figure 11:
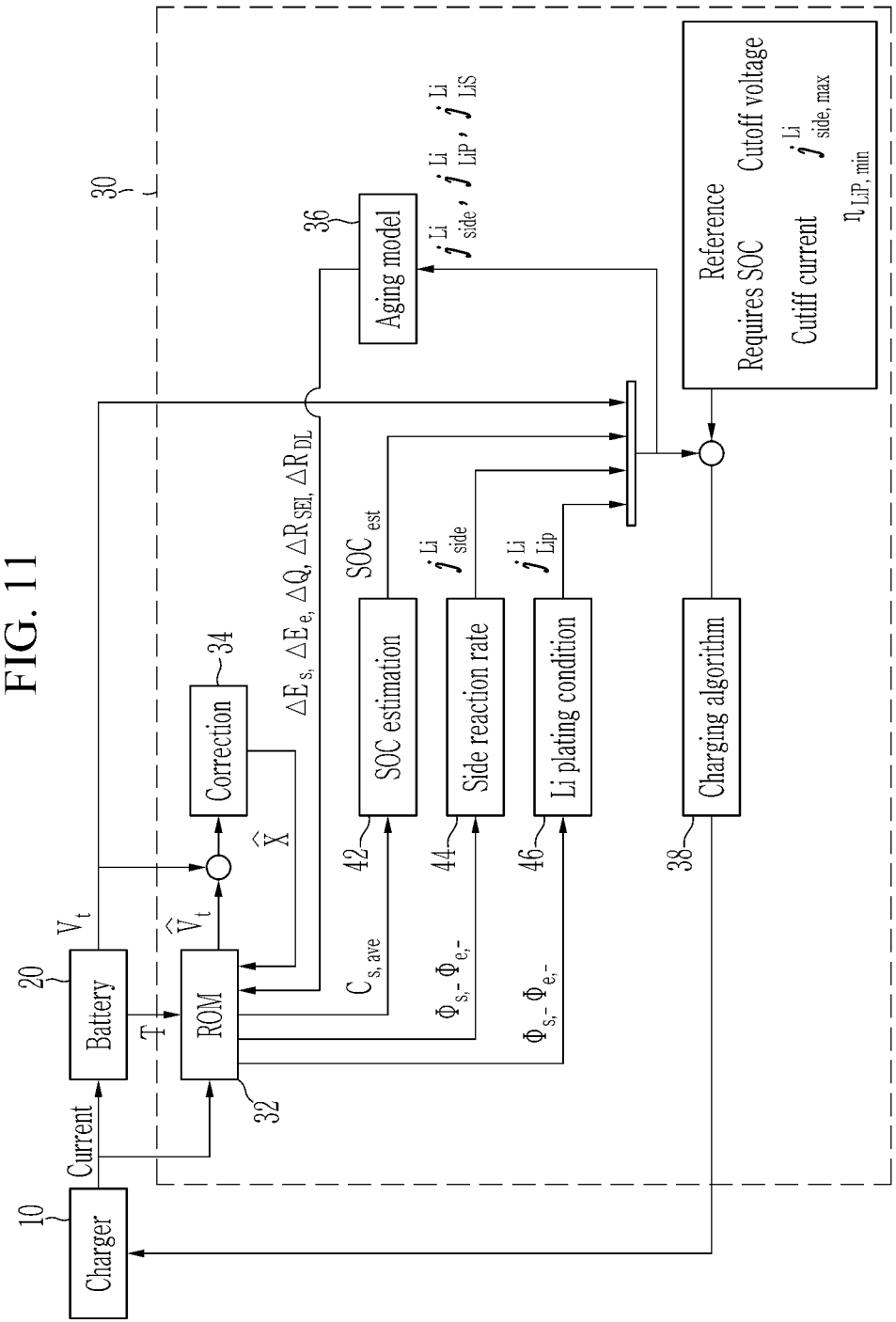
FIG. 11 is a schematic block diagram of a system for raid charging a lithium ion battery in one form of the present disclosure.

Based on these constraints, a system for rapid charging a lithium ion battery is proposed. As shown in FIG. 11, the system for rapid charging a lithium ion battery 20 in some forms of the present disclosure includes a charger 10 and a controller 30. The charger 10 can apply electric current to the battery 20 to charge the battery 20. The controller 30 includes the reduced order electrochemical model (ROM) 32, a correction 34, an aging model 36 and a charging algorithm 38. In addition, the controller 30 communicatively connected to the charger 10 and the battery 20 to receive states of the battery or send commands to the charger 10. The ROM 32 may include an SOC model 42 for estimating the SOC, a side reaction model 44 for estimating the side reaction rate ($j_{side}^{Li}$), and a degradation (lithium plating/stripping mode) model 46 or estimating the lithium plating rate ($j_{LiP}^{Li}$) and the lithium stripping rate ($j_{LiS}^{Li}$), as described above. To these ends, the controller 30 can calculate internal state values of the battery 20, such as the ion concentration or the solid and the electrolyte potential.

The system further includes a plurality of sensors for detecting at least a terminal voltage ($V_t$) of the battery 20 and an ambient temperature (T).

The correction 34 includes an extended Kalman filter (EKF) and is configured to correct the ROM 32 (e.g., to correct the internal state values of the battery 20). For example, the controller 30 estimates a terminal voltage using the ROM 32 and continuously compares the estimated terminal voltage with the detected terminal voltage to follow physical internal variables of the battery 20. Any errors between the estimated terminal voltage and the detected terminal voltage due to inaccuracy of the ROM 32 and measurements are further improved by a feedback loop with a correction 34 using the EKF. The corrected ROM 32 is used to estimate the surface ion concentrations and the anode potentials that allow for estimation of the SOC, the side reaction rate and the lithium plating rate, respectively. Since the extended Kalman filter (EKF) is well known to a person skilled in the art, detailed description thereof will be omitted. In addition, the degradation model 46 is incorporated into the ROM 32 and its aging parameters are updated as cycled.

The aging model 36 receives the side reaction rate ($j_{side}^{Li}$), the lithium plating rate ($j_{LiP}^{Li}$) and the lithium stripping rate ($j_{side}^{Li}$) from the ROM 32 and calculates changed characteristics ($\Delta\varepsilon_s$, $\Delta\varepsilon_e$, $\Delta Q$, $\Delta R_{SEI}$, $\Delta R_{DL}$) of the battery 20. After that, the aging model 36 reflects the changed characteristics ($\Delta\varepsilon_s$, $\Delta\varepsilon_e$, $\Delta Q$, $\Delta R_{SEI}$, $\Delta R_{DL}$) of the battery 20 on the ROM 32.

The charging algorithm 38 receives the SOC from the SOC model 42, the side reaction rate ($j_{side}^{Li}$) from the side reaction model 44, the lithium plating rate ($j_{LiP}^{Li}$) from the degradation model 46 and the terminal voltage ($V_t$) from the battery 20. The charging ($j_{LiP}^{Li}$) alorithm 38 compares the SOC, the side reaction rate ($j_{side}^{Li}$). the lithium plating rate ($j_{LiP}^{Li}$) and the terminal voltage ($V_t$) with the predetermined references (e. g., the side reaction rate at 40% SOC, φs–φe=0, cutoff voltage (4.2V), etc.) to generate a charging protocol. SOC and C rate relationship is stored in the charging algorithm 38, and the charging alogrithm 38 gnerates the charging protocol based on the SOC and C rate relationship.

Figure 12:
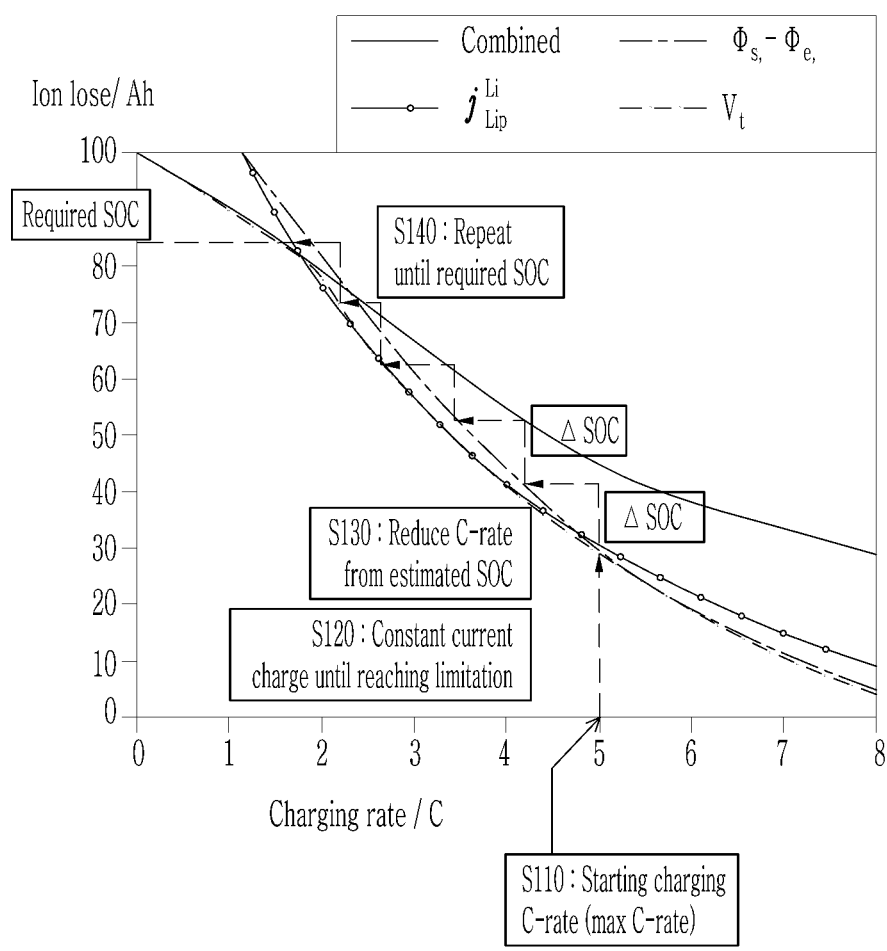
FIG. 12 is a graph showing determination of charging C rates considering three limitations.

The charging protocol in some forms of the present disclosure is shown in FIG. 12. The charging protocol in some forms of the present disclosure includes starting charging with maximum C rate at step S110, performing constant current (CC) charging until reaching at least one of the limitations (e.g., the predetermined references) at step S120, if the at least one of the limitations is reached, reducing the C rate according to the estimated SOC at step S130 and repeating the step S110 to the step S130 until reaching the required SOC at step S140.

In further detail, the charging starts with the maximum C rate of 5C that is determined under consideration of a maximum heat generation. At an every incremented SOC, the charging algorithm 38 checks if the applying C rates cause any variables to reach the aforementioned three limitations, which is repeated until the required SOC or a certain preset stop condition, such as cutoff current are reached. For example, the cutoff current may be set as 1/40 C.

Figure 13A:
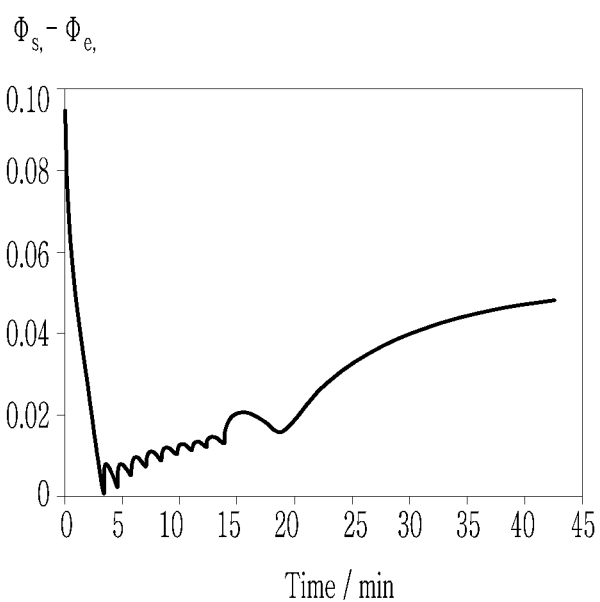
FIG. 13A is a graph showing an anode potential produced by simulating a method for rapid charging a lithium ion battery in one form of the present disclosure.
Figure 13B:
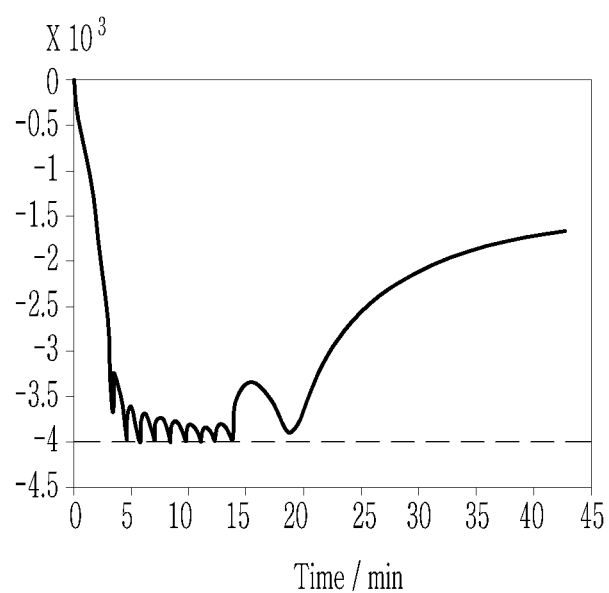
FIG. 13B is a graph showing a side reaction rate produced by simulating a method for rapid charging a lithium ion battery in one form of the present disclosure.

The anode potential and the side reaction rate produced by the method in some forms of the present disclosure calculated by simulation is plotted in FIGS. 13A and 13B. Due to the limitation for the charging current, both variables do not exceed the predetermined limitations (references). Consequently, prevention of formation of the lithium plating and minimization of the side reaction are possible.

Figure 14:
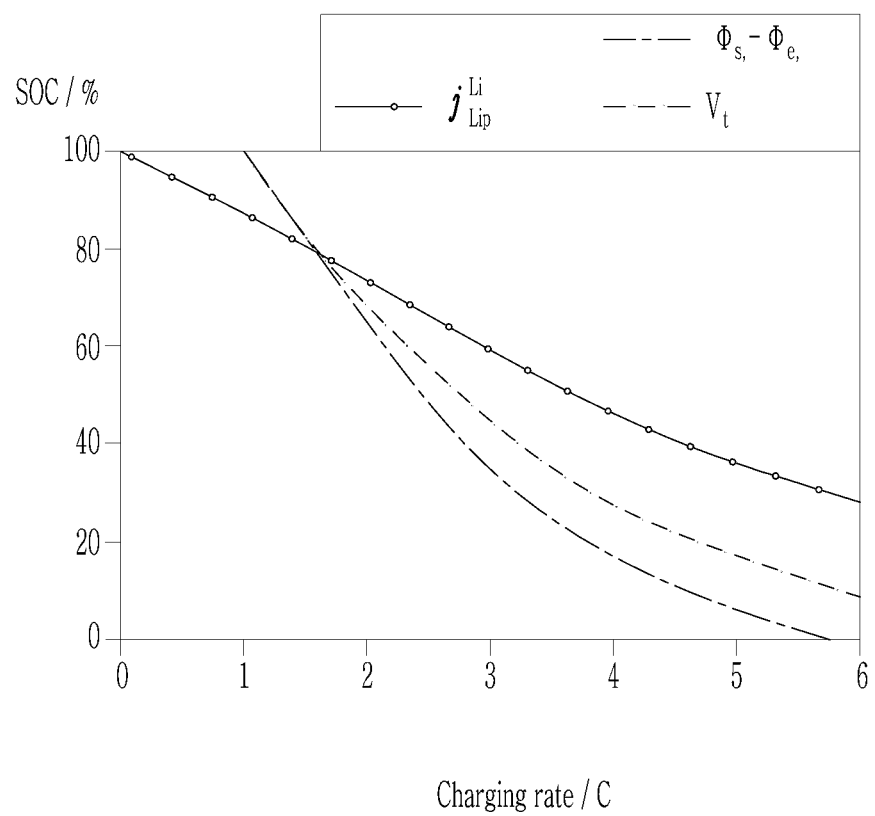
FIG. 14 is a graph showing an updated SOC and C rate relationship after 50 cycles.
Figure 15:
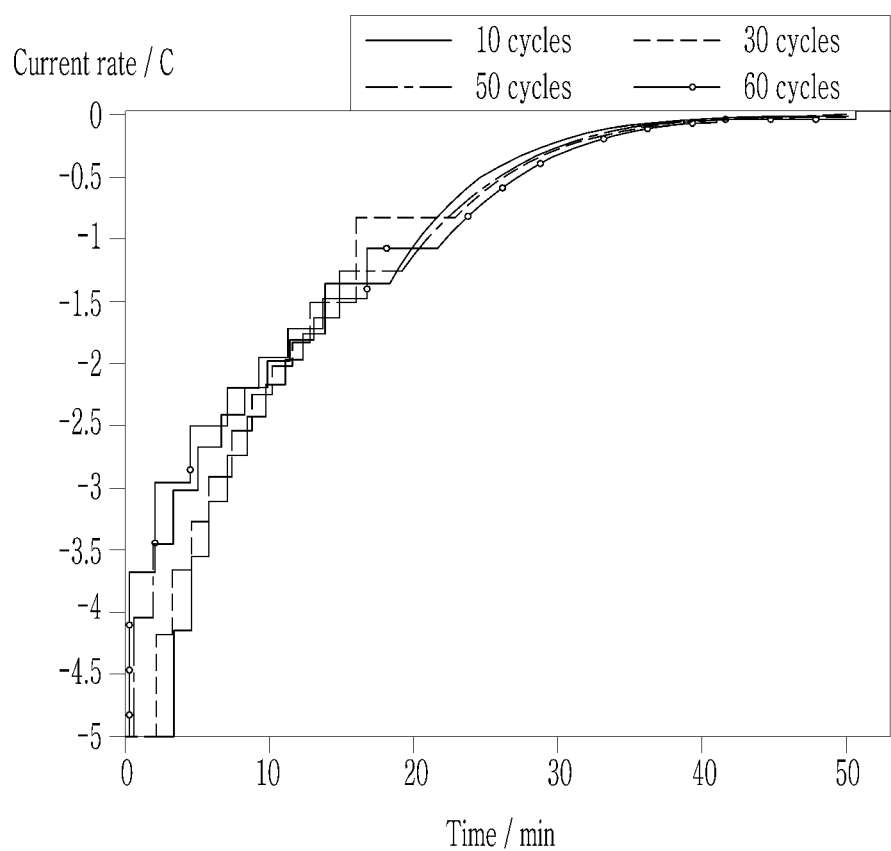
FIG. 15 is a graph showing different charging protocols updated as a function of cycles using a degradation model.

As the cycle number increases, the cell gets aged. The aged cell has the decreased volume fraction of the electrolyte that increases the potential of the electrolyte and as a result decreases the anode potential, so the anode potential likely becomes negative. In addition, due to the deposition, the resistance gets increased and the terminal voltage increases more easily and reaches the cutoff voltage earlier. Therefore, the charging protocol should be updated. The updated SOC and C rate relationship after 50 cycles is plotted in FIG. 14. As shown in FIG. 14, effect of the anode potential on degradation increases as cell gets aged and the charging current gets more restricted than that by the limitation of the side reaction rate. Finally, the anode potential and the terminal cutoff voltage become two limitations. Corresponding charging protocols are shown in FIG. 15. As shown in FIG. 15, the charging current is continuously reduced due to limitation by the anode potential at a low SOC range and by the cutoff voltage at a high SOC range. As described above, the aging model 36 reflects the changed characteristics ($\Delta\varepsilon_s$, $\Delta\varepsilon_e$, $\Delta Q$, $\Delta R_{SEI}$, $\Delta R_{DL}$) of the battery 20 on the ROM 32 to update the SOC and C rate relationship, thereby generating the updated charging protocol.

4. Charging Protocol with Negative Pulse

Figure 16:
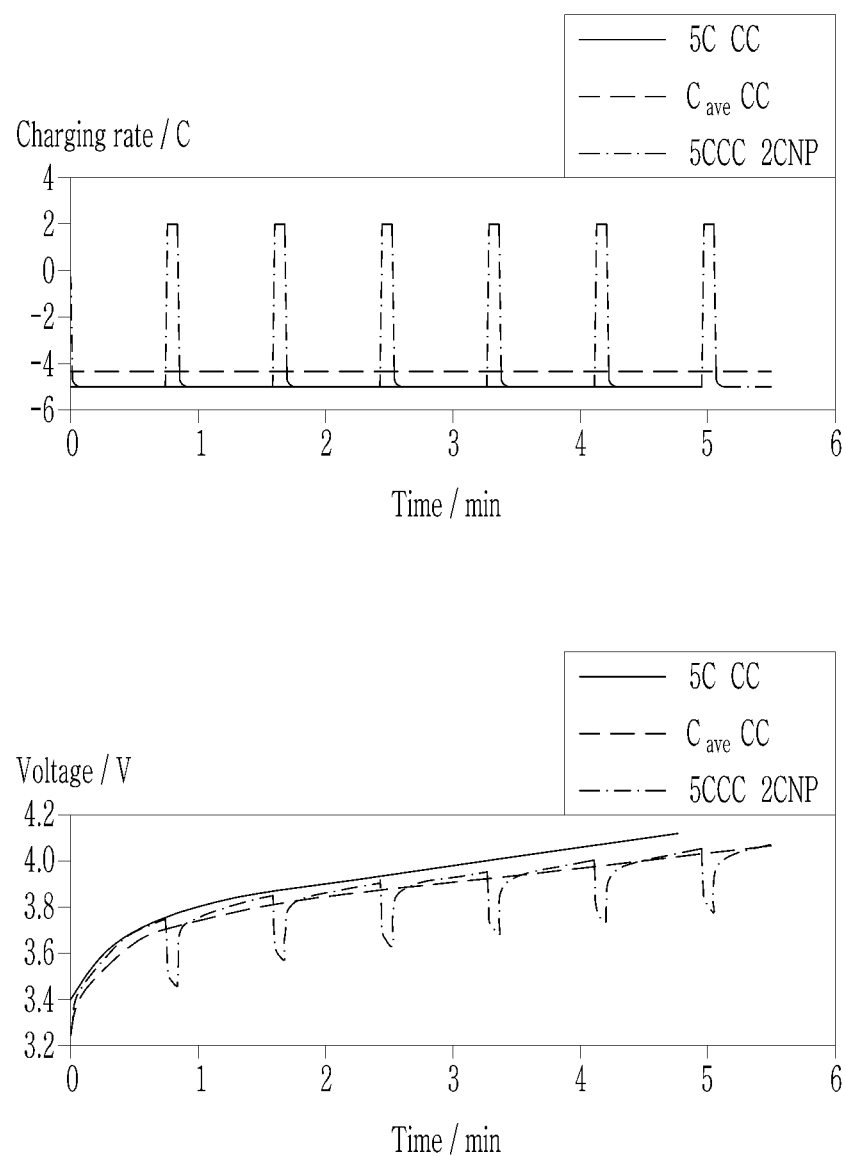
FIG. 16 are graphs showing comparison of a charging current and a voltage using 5C CC charging, 4.3C CC charging and 5C CC with 2C negative pulse charging.

Theoretically, no lithium plating should be formed if the anode potential is larger than 0V. In reality, the lithium plating could have been formed from previous cycling or can be formed from any unknown reasons. For such cases, ideally, the lithium stripping enables to recover the ions out of the plated lithium, which can be carried out by discharge pulse currents. In order to study effects of the discharging current, a cycling tests with 5C CC, 5C CC with 2C negative pulses and 4.3 CC that is the average current of the pulse current are conducted. The profile of the current and the voltage during charging is plotted in FIG. 16. As shown in FIG. 16, charging times of the 5C CC with 2C negative pulses charging and the CC charging with average current (4.3 CC charging) are almost identical.

Figure 17:
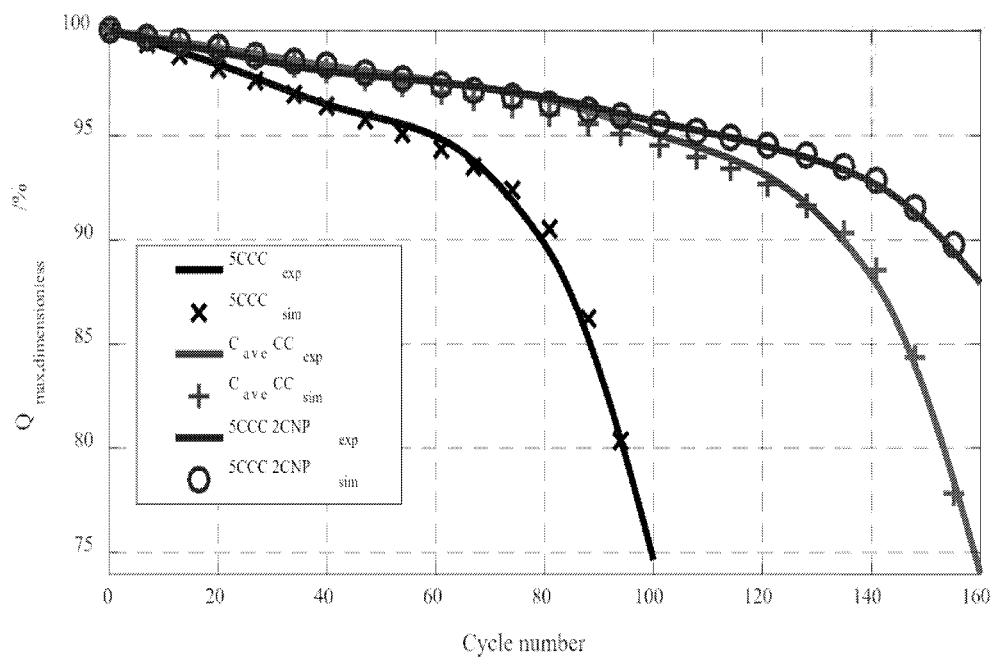
FIG. 17 is graph showing experimental and simulated capacity fade with 5C CC charging, 4.3C CC charging and 5C CC with 2C negative pulse charging.

The capacity loss of the three charging methods is measured experimentally and compared with the model. As shown in FIG. 17, simulation results match experimental results well. Because the 5C CC charging can charge battery faster than other two methods, degradation speed is the fastest. Up to 60 cycles, the capacity loss is dominantly caused by the side reaction and then the capacity decreases rapidly because of the lithium plating. Comparison between the CC charging that has the same average current of the pulse currents and the 5C CC with 2C negative pulses charging has shown that effects of negative pulses are not significant until 100 cycles because the lithium plating is not formed yet. When the cycle number is larger than 100 cycles, the lithium plating starts to form heavily and then the negative pulse currents take more effective in recovering the ions. At the 160 cycles, the charging protocol employing negative pulses has accomplished 14% less capacity fade than that by the CC charging with average current.

Figure 18:
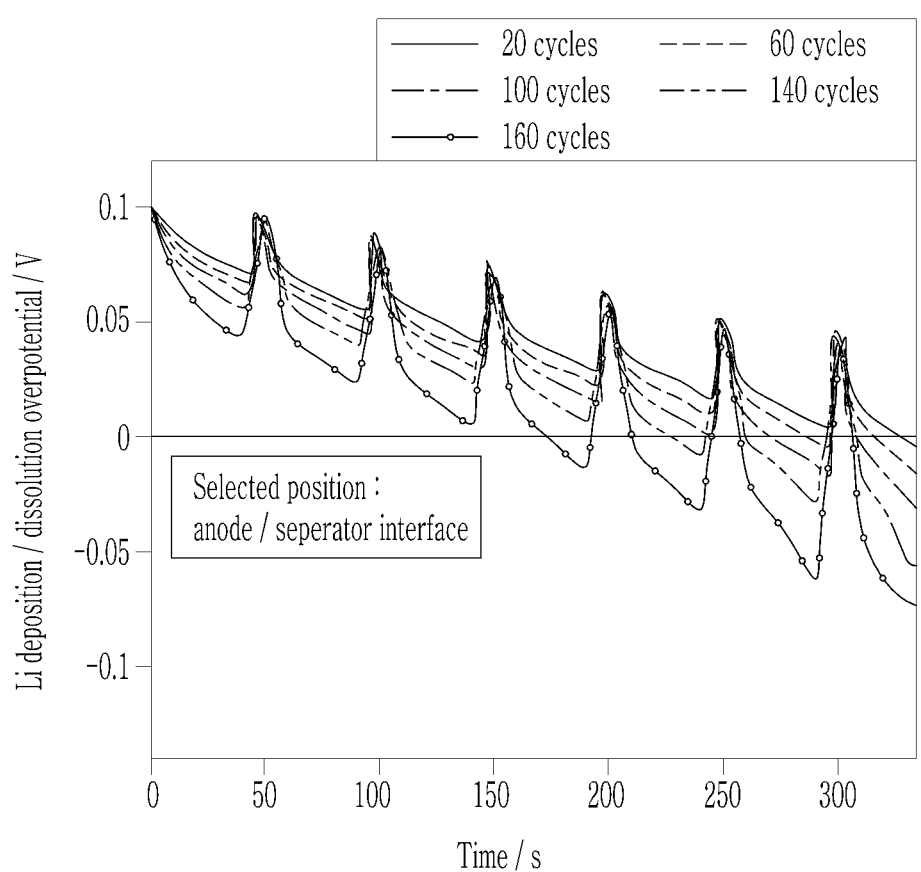
FIG. 18 is a graph showing a lithium deposition and dissolution reaction overpotential during 5C CC with 2C negative pulse charging.

Since the rate of the lithium deposition reaction is a function of the over potential, the over potentials at the pulse charging are calculated and plotted over time as a function of the cycles, as shown in FIG. 18. When the negative pulses are applied, the over potentials tend to follow the pulse form of the current profiles and become positive.

At the end of 20 cycles, there is a short period of time where the potential becomes negative and the lithium plating is formed. As cycle number increases, the formation becomes more frequent, but the positive potentials produced by the negative pulse currents induces the lithium stripping. The more lithium plating is formed, the more effective becomes the positive pulse that recovers the ions. In addition, the stripping takes more effective at the low SOC because the over potential decreases when the SOC becomes high.

Figure 19:
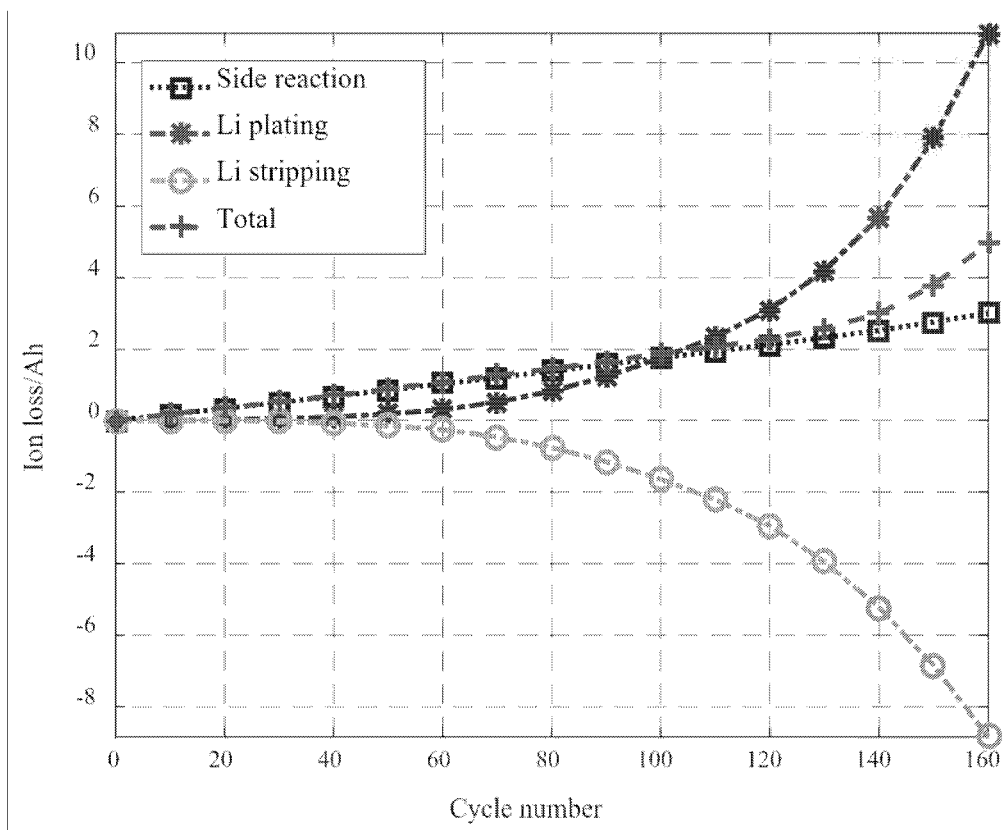
FIG. 19 is a graph showing an ion loss from a side reaction and a lithium deposition and dissolution reaction and a total ion loss.

Ion loss and recovery caused by the side reaction and the lithium deposition and dissolution reaction is calculated using the validated model and plotted in FIG. 19. Note that negative value means the ions are recovered. A line with square symbols indicates the ion loss caused by the side reaction, a line with star symbols is that by the lithium plating, a line with circle symbols is the ion recovery by the lithium stripping, and a line with plus sign symbols is a total sum of the ion loss by all reactions. Even though a large number of ions are lost by the lithium plating, negative pulses enable to recover most of them, so the total ion loss using the negative pulses is much smaller than that by the CC charging with the same average current.

Therefore, adding the negative pulses during the CC charging allows for minimization of the degradation simply using the lithium stripping effects without increasing extra charging time. Cycle tests using the fast charging with negative pulses (FCNP) in some forms of the present disclosure and 3C CC/CV are conducted.

Figure 20:
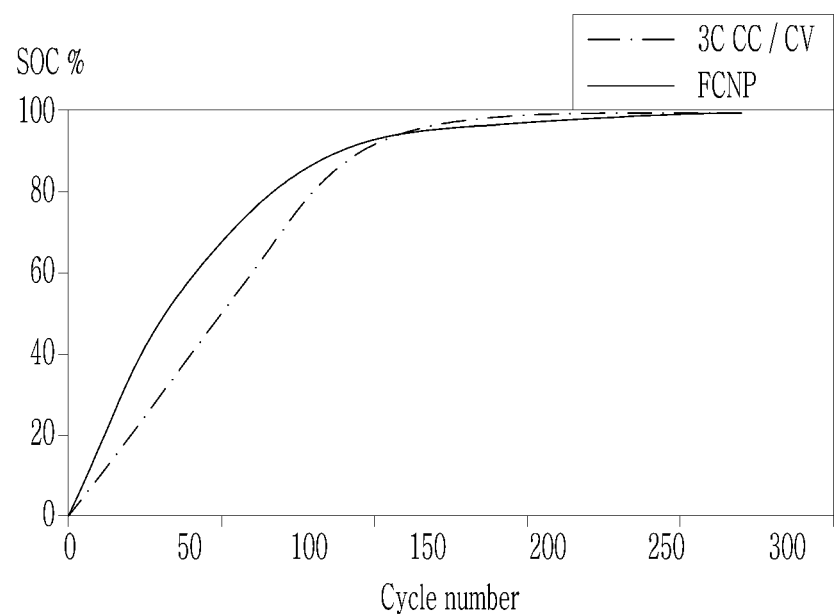
FIG. 20 is a graph showing a charging response using a method for rapid charging in one form of the present disclosure and 3C CC/CV charging.
Figure 21:
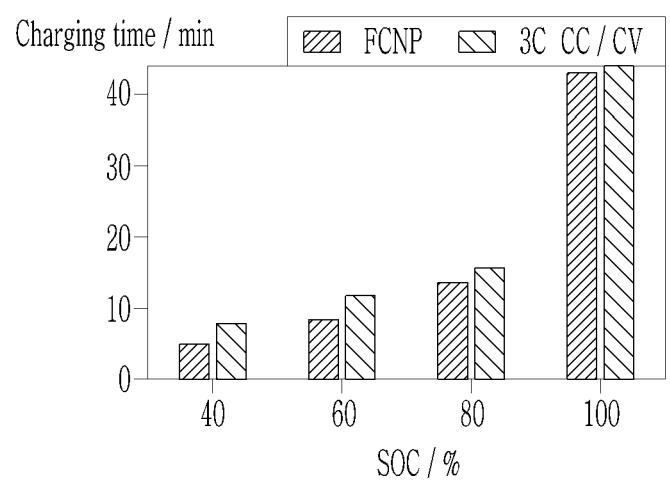
FIG. 21 is a graph showing a charging time at different SOC intervals using a method for rapid charging in one form of the present disclosure and 3C CC/CV charging.

Charging response of the cell up to 100% SOC is compared each other, as shown in FIG. 20 and the corresponding charging time is plotted in FIG. 21 as a function of SOC intervals. Due to the high charging current at the low SOC range, the charging time by the FCNP up to 40% SOC becomes 37% less than that by the 3C CC/CV, which results in 13% less up to 80% SOC.

Figure 22:
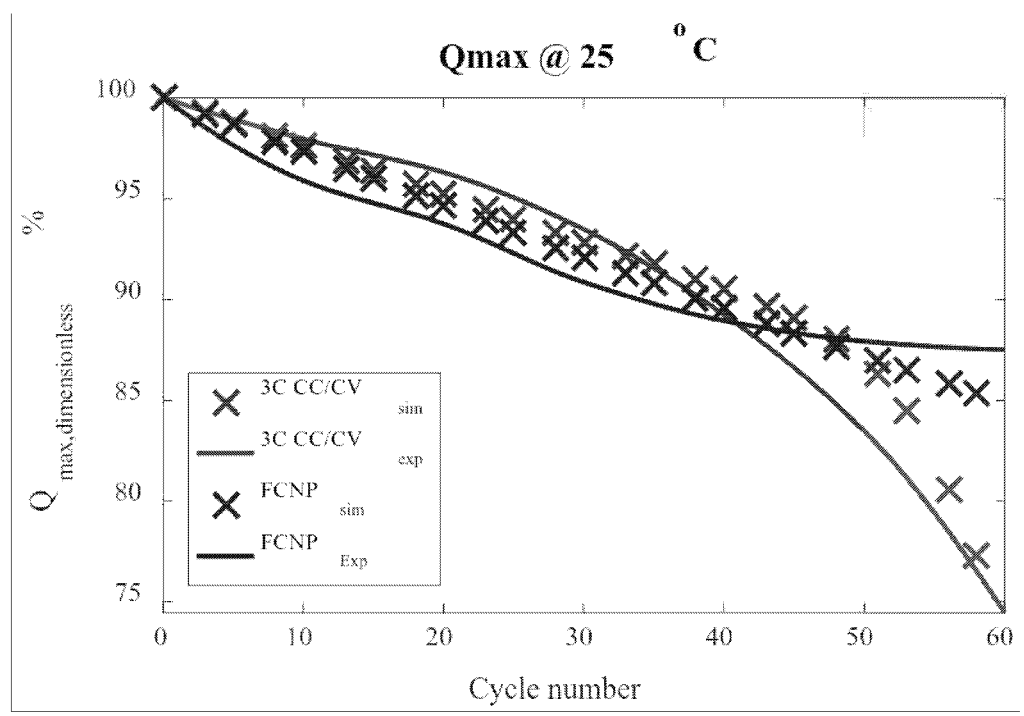
FIG. 22 is a graph showing a capacity loss by 3C CC/CV charging and a method for rapid charging in one form of the present disclosure.

In addition, the capacity loss is measured as a function of the cycle number, as shown in FIG. 22. From beginning to 40 cycles, the capacity loss by the FCNP is similar to that by the 3C CC/CV charging. Thereafter, the capacity by the 3C CC/CV drops rapidly because the lithium plating takes effects, while the capacity by the FCNP becomes less because of prevented lithium plating and lithium stripping, so the difference of the capacity detention becomes 13% at 60 cycles approximately.

Considering these results, the FCNP is incorporate with the charging protocol in some forms of the present disclosure at the low SOC rage (e.g., up to a predetermined SOC (40%)). That is, while performing the CC charging until reaching the at least one of the limitations at step S120, the negative pulses are periodically applied at the low SOC range. In further detail, a constant positive current is applied for a first period and then a constant negative current is applied for a second period at the low SOC range. The constant positive current is calculated from the SOC and C rate relationship stored in the charging algorithm 38 based on the estimated SOC of the battery 20, and the constant negative current may be predetermined. For example, the constant negative current may be 2C. In addition, the first period may be 45 seconds and the second period may be 5 seconds. However, the first and second periods may not be limited to these values. Setting the first and second periods are described by A. M. Mohamed et al., "Influence analysis of static and dynamic fast-charging current profiles on ageing performance of commercial lithium-ion batteries," Energy 120: 179-191, 2017, the entire content of which is hereby incorporated herein by reference.

In summary, the FCNP incorporated with the charging protocol in some forms of the present disclosure is the safest method that prevents not only a new formation of the lithium plating, but also allows for recovery of the ions out of the plated lithium, so that a growth of dendrites could be suppressed without increasing the charging time.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for rapid charging a lithium ion battery, comprising:
   generating a reduced order electrochemical model (ROM) of the lithium ion battery in which a state-of-charge (SOC) model, a side reaction model and a degradation model are embedded;
   calculating an SOC, a side reaction rate, and a lithium plating rate from the ROM;
   generating a charging protocol based on the SOC and a required SOC; and
   applying the charging protocol to the lithium ion battery;
   wherein generating the charging protocol comprises:
   calculating a charging rate (C rate) based on the calculated SOC and the required SOC from a predetermined SOC and C rate relationship; and
   applying the charging protocol to the lithium ion battery comprises performing a constant current (CC) charging with the calculated C rate until at least one of the side reaction rate, the lithium plating rate, or the terminal voltage reaches a predetermined threshold.

2. The method of claim 1, wherein the method further comprises:
   when the CC charging with the calculated C rate is performed, determining whether at least one of the side reaction rate, the lithium plating rate or a terminal voltage reaches a predetermined threshold;
   when at least one of the side reaction rate, the lithium plating rate or the terminal voltage is determined to reach the predetermined threshold, recalculating the C rate based on the calculated SOC and the required SOC from the predetermined SOC and C rate relationship; and
   performing the CC charging with the recalculated C rate.

3. The method of claim 1, wherein the method further comprises:
   correcting the ROM with an extended Kalman filter (EKF).

4. The method of claim 1, wherein the method further comprises:
   calculating a lithium stripping rate from the ROM; and
   updating the predetermined SOC and C rate relationship based on the side reaction rate, the lithium plating rate, and the lithium stripping rate.

5. The method of claim 1, wherein the method comprises:
   when the calculated SOC is lower than or equal to a predetermined SOC while performing the CC charging with the calculated C rate, applying negative pulses with a constant negative current.

6. The method of claim 5, wherein applying the negative pulses with the constant negative current further comprises:
   applying a constant positive current corresponding to the calculated C rate to the lithium ion battery for a first period; and
   applying a constant negative current to the lithium ion battery for a second period.

7. A method for rapid charging a lithium ion battery, comprising:
   (a) generating a reduced order electrochemical model (ROM) of the lithium ion battery in which a state-of-charge (SOC) model, a side reaction model and a degradation model are embedded;
   (b) calculating an SOC, a side reaction rate, a lithium plating rate, and a lithium stripping rate from the ROM;

(c) performing a constant current (CC) charging with a maximum charging (C) rate;

(d) determining whether at least one of the side reaction rate, the lithium plating rate or a terminal voltage reaches a predetermined threshold;

(e) recalculating a C rate based on the calculated SOC and a required SOC from a predetermined SOC and C rate relationship; and (f) performing the CC charging with the recalculated C rate.

8. The method of claim 7, wherein the step (b) to the step (f) are repeated until reaching the required SOC.

9. The method of claim 7, wherein the step (a) comprises: correcting the ROM using an extended Kalman filter (EKF).

10. The method of claim 7, wherein the step (e) comprises:
updating the predetermined SOC and C rate relationship based on the side reaction rate, the lithium plating rate, and the lithium stripping rate.

11. The method of claim 7, wherein the method comprises:
when the calculated SOC is lower than or equal to a predetermined SOC in the step (c) and the step (f), applying negative pulses with a constant negative current.

12. The method of claim 11, wherein applying the negative pulses with the constant negative current further comprises:
applying a constant positive current corresponding to the calculated C rate to the lithium ion battery for a first period; and
applying a constant negative current to the lithium ion battery for a second period.

13. A system for rapid charging a lithium ion battery, comprising:
a charger configured to apply current to the lithium ion battery; and
a controller configured to:
generate a reduced order electrochemical model (ROM) of the lithium ion battery in which a state-of-charge (SOC) model, a side reaction model and a degradation model are embedded;
calculate a SOC, a side reaction rate, and a lithium plating rate from the ROM;
generate a charging protocol based on the SOC and a required SOC; and
apply the charging protocol to the lithium ion battery through the charger wherein the controller is further configured to:
calculate a charging rate (C rate) based on the calculated SOC and the required SOC from a predetermined SOC and C rate relationship; and
perform a constant current (CC) charging with the calculated C rate until at least one of the side reaction rate, the lithium plating rate or a terminal voltage reaches a predetermined threshold.

14. The system of claim 13, wherein the controller is further configured to:
determine whether at least one of the side reaction rate, the lithium plating rate or a terminal voltage reaches a predetermined threshold when the CC charging with the calculated C rate is performed;
recalculate the C rate based on the calculated SOC and the required SOC from the predetermined SOC and C rate relationship when at least one of the side reaction rate, the lithium plating rate or a terminal voltage is determined to reach the predetermined threshold; and
perform the CC charging with the recalculated C rate.

15. The system of claim 13, wherein the controller is configured to:
correct the ROM with an extended Kalman filter (EKF).

16. The system of claim 13, wherein the controller is further configured to:
calculate a lithium stripping rate from the ROM; and
update the predetermined SOC and C rate relationship based on the side reaction rate, the lithium plating rate, and the lithium stripping rate.

17. The system of claim 13, wherein the controller is further configured to:
apply negative pulses with a constant negative current when the calculated SOC is lower than or equal to a predetermined SOC while performing the CC charging with the calculated C rate.

18. The system of claim 17, wherein the controller, when the negative pulses with the constant negative current is applied, is further configured to:
apply a constant positive current corresponding to the calculated C rate to the lithium ion battery for a first period; and
apply a constant negative current to the lithium ion battery for a second period.

* * * * *